(12) United States Patent
Choi et al.

(10) Patent No.: US 10,997,973 B2
(45) Date of Patent: May 4, 2021

(54) VOICE RECOGNITION SYSTEM HAVING EXPANDED SPATIAL RANGE

(71) Applicant: SAMSUNG ELECTRONICS CO., LTD., Suwon-si (KR)

(72) Inventors: Myoung-soon Choi, Hwaseong-si (KR); Jong-hyuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/073,864

(22) PCT Filed: Aug. 4, 2016

(86) PCT No.: PCT/KR2016/008592
§ 371 (c)(1),
(2) Date: Jul. 30, 2018

(87) PCT Pub. No.: WO2017/135531
PCT Pub. Date: Aug. 10, 2017

(65) Prior Publication Data
US 2019/0035398 A1 Jan. 31, 2019

(30) Foreign Application Priority Data
Feb. 5, 2016 (KR) .......................... 10-2016-0015280

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *G10L 15/30* (2013.01);
(Continued)

(58) Field of Classification Search
CPC ... G10L 15/22; G10L 15/08; G10L 2015/088; G10L 2015/223; G06F 3/167
(Continued)

(56) References Cited

U.S. PATENT DOCUMENTS 9,569,815 B1 * 2/2017 Abuelsaad ................ G06T 3/40
9,798,309 B2 * 10/2017 Tirpak ................ H04L 12/2816
(Continued)

FOREIGN PATENT DOCUMENTS

KR 10-2008-0096239 10/2008
KR 10-2009-0025939 3/2009
(Continued)

OTHER PUBLICATIONS

International Search Report for PCT/KR2016/008592, with English Translation, dated Nov. 28, 2016, 4 pages.
(Continued)

*Primary Examiner* — Jakieda R Jackson
(74) *Attorney, Agent, or Firm* — Nixon & Vanderhye, P.C.

(57) ABSTRACT

Disclosed is a voice recognition apparatus connected via a network and sharing a voice recognition function. The voice recognition apparatus includes: a microphone configured to receive a voice signal from a user's speech; a communicator configured to communicate with at least one external voice recognition apparatus; a voice recognizer configured to determine a wake-up word involved in the voice signal; and a controller configured to transmit the voice signal to the external voice recognition apparatus corresponding to the determined wake-up word. Thus, it is possible to overcome a limited voice recognition distance caused by a physical characteristic of a microphone and expand a spatial range where voice recognition is possible, thereby providing various voice recognition services to a user in more places.

12 Claims, 12 Drawing Sheets

(51) Int. Cl.
*G10L 15/30* (2013.01)
*H04R 3/00* (2006.01)

(52) U.S. Cl.
CPC .. *G10L 2015/088* (2013.01); *G10L 2015/223* (2013.01); *H04R 3/005* (2013.01)

(58) Field of Classification Search
USPC ..................................................... 704/9, 275
See application file for complete search history.

(56) References Cited

U.S. PATENT DOCUMENTS

| | | | |
|---|---|---|---|
| 2004/0263636 A1 | 12/2004 | Cutler et al. | |
| 2005/0143981 A1* | 6/2005 | Koyanagi | H03M 13/00 704/211 |
| 2007/0132838 A1* | 6/2007 | Fujimoto | H04N 7/15 348/14.08 |
| 2009/0061381 A1* | 3/2009 | Durbin | A61C 9/0053 433/24 |
| 2009/0164215 A1* | 6/2009 | Lu | G10L 15/26 704/246 |
| 2009/0221307 A1* | 9/2009 | Wolak | H04W 4/21 455/466 |
| 2011/0035767 A1* | 2/2011 | Lee | H04N 7/17318 725/24 |
| 2012/0066732 A1* | 3/2012 | Devericks | H04N 21/23439 725/109 |
| 2013/0238326 A1* | 9/2013 | Kim | G06F 3/167 704/231 |
| 2014/0222436 A1* | 8/2014 | Binder | G06F 3/167 704/275 |
| 2014/0244712 A1* | 8/2014 | Walters | H04L 67/10 709/202 |
| 2014/0310002 A1* | 10/2014 | Nitz | G10L 15/1822 704/270.1 |
| 2014/0337151 A1* | 11/2014 | Crutchfield | G06F 1/1601 705/17 |
| 2015/0002740 A1* | 1/2015 | Yanagihara | H04N 5/602 348/515 |
| 2015/0006176 A1* | 1/2015 | Pogue | G10L 15/22 704/249 |
| 2015/0228419 A1* | 8/2015 | Fadell | H05B 47/19 307/112 |
| 2015/0264299 A1* | 9/2015 | Leech | G06F 3/013 348/78 |
| 2015/0287310 A1* | 10/2015 | Deliuliis | G08B 21/10 340/628 |
| 2016/0098992 A1* | 4/2016 | Renard | G10L 15/18 704/275 |
| 2016/0155443 A1* | 6/2016 | Khan | G06F 1/3203 704/275 |
| 2016/0300474 A1* | 10/2016 | Warren | G08B 25/14 |
| 2016/0314782 A1* | 10/2016 | Klimanis | G10L 15/065 |
| 2017/0090864 A1* | 3/2017 | Jorgovanovic | G10L 21/0332 |
| 2017/0091521 A1* | 3/2017 | Tieu | G06K 9/00067 |

FOREIGN PATENT DOCUMENTS

| | | |
|---|---|---|
| KR | 10-2011-0053549 | 5/2011 |
| KR | 10-2013-0045471 | 5/2013 |
| KR | 10-2014-0089795 | 7/2014 |
| KR | 10-2014-0106715 | 9/2014 |

OTHER PUBLICATIONS

Written Opinion of the ISA for PCT/KR2016/008592 dated Nov. 28, 2016, 7 pages.

* cited by examiner

VOICE RECOGNITION SYSTEM HAVING EXPANDED SPATIAL RANGE

This application is the U.S. national phase of International Application No. PCT/KR2016/008592 filed Aug. 4, 2016, which designated the U.S. and claims priority to KR Patent Application No. 10-2016-0015280 filed Feb. 5, 2016, the entire contents of each of which are hereby incorporated by reference.

TECHNICAL FIELD

The present invention relates to an apparatus, a method and a system for voice recognition, which can expand a range of the voice recognition and provide a more improved service.

BACKGROUND

In general, technology of voice recognition detects a user's analog voice through a microphone, makes the detected voice to subjected to some processes of a client, transmits data to a server, makes the data be subjected to natural language understanding (NLU), a digital manager (DM), and the like processes, and provides a service through third-party service interworking.

To detect a voice, the microphone is required. In this case, there is a limit to a recognition distance between the microphone and a user. To overcome such a limit, a physical effort to widen the recognition distance using a lot of microphones has been made along with technique development for various algorithms. Further, a voice may be input through a microphone of a remote controller directly paired with a device. However, despite such efforts, there is a spatial limit to the voice recognition. For example, when a voice recognition device is in a room, a voice command issued in a living room is not recognized due to the limit of the recognition distance.

In particular, many voice recognition apparatuses are different from one another in service supported therein. For example, a smart TV is mostly configured to support services for recognizing a broadcast program and video content, while a smart phone is configured to support services for music and the like customized content.

Likewise, various service domains are present. Therefore, with regard to various voice recognition apparatuses, a user has no choice but to differently make requests for services respectively suited for the voice recognition apparatuses.

SUMMARY

An object of the present invention is to overcome a limited voice recognition distance caused by a physical limit of a microphone in a voice recognition apparatus and expand a spatial range where voice recognition is possible, thereby providing a voice recognition apparatus and method which can provide various voice recognition services to a user in more places.

Another object of the present invention is to provide a voice recognition apparatus and method which can provide more various voice recognition services with a single voice recognition apparatus in a space wider than a current recognition range anywhere by sharing functions of a plurality of voice recognition apparatuses each functioning to provide a unique voice recognition service In accordance with a first embodiment of the present invention, a voice recognition apparatus comprises: a microphone configured to receive a voice signal from a user's speech; a communicator configured to communicate with at least one external voice recognition apparatus; a voice recognizer configured to determine a wake-up word involved in the voice signal; and a controller configured to transmit the voice signal to the external voice recognition apparatus corresponding to the determined wake-up word.

The communicator may receive a result of processing a request service involved in the voice signal from the external voice recognition apparatus that has transmitted the voice signal.

There may be further provided an output unit through which the controller provides the result of processing the service from the external voice recognition apparatus to a user.

The communicator may receive a voice signal from the at least one external voice recognition apparatus.

The controller may perform a request service involved in the voice signal received from the at least one external voice recognition apparatus.

The controller may transmit the result of processing the service to the external voice recognition apparatus that has transmitted the voice signal.

The controller may determine capability of an output unit of the external voice recognition apparatus that has transmitted the voice signal, and transmit the result of processing the service suitable for the capability of the output unit.

The controller may transmit the voice signal to a server through the communicator and receive the information about the request service involved in the voice signal or a result of processing the request service from the server when the voice recognizer cannot determine information about a request service involved in the voice signal.

The at least one external voice recognition apparatus may be connected via Internet of things (IoT).

In accordance with a second embodiment of the present invention, a voice recognition apparatus comprises a microphone configured to receive a voice signal from a user's speech; a communicator configured to communicate with at least one external voice recognition apparatus; a voice recognizer configured to determine a request service involved in the voice signal; and a controller configured to select an external voice recognition apparatus capable of processing the request service among the at least one of external voice recognition apparatus, and transmit the voice signal to the selected external voice recognition apparatus when the determined request service is not performable.

There may be further provided a storage configured to store service domain information and apparatus capability information of the at least one external voice recognition apparatus.

The controller may select the external voice recognition apparatus capable of processing the request service, based on at least one of the service domain information and apparatus capability information.

The communicator may receive the voice signal from the at least one external voice recognition apparatus.

The controller may perform the request service involved in the voice signal.

The controller may transmit the result of performing the service to the external voice recognition apparatus that has transmitted the voice signal.

In accordance with a third embodiment of the present invention, a voice recognition apparatus comprises a microphone configured to receive a voice signal from a user's speech; a communicator configured to communicate with at least one external voice recognition apparatus; a voice recognizer configured to determine a request service involved in the voice signal; and a controller configured to transmit the voice signal to the at least one external voice recognition apparatus when the request service from the voice signal is not determinable.

The communicator may receive the voice signal from the at least one external voice recognition apparatus.

The voice recognizer may determine the request service involved in the voice signal received from the at least one external voice recognition apparatus, and the controller may determine whether the determined request service is performable.

The controller may perform the request service when the request service is performable, and transmit the result of performing the service to the external voice recognition apparatus that has transmitted the voice signal.

In accordance with one embodiment of the present invention, a voice recognition system comprises a plurality of voice recognition apparatuses formed as a network cluster, wherein a first voice recognition apparatus among the plurality of voice recognition apparatuses receives a voice signal from a user's speech, determines information involved in the voice signal, selects a second voice recognition apparatus based on the determined information among the plurality of voice recognition apparatuses, and transmits the voice signal to the selected second voice recognition apparatus, and the second voice recognition apparatus processes a request service involved in the received voice signal, and transmits the processed request service to the first voice recognition apparatus.

The second voice recognition apparatus may be selected based on at least one of a wake-up word involved in the voice signal and request service information.

The plurality of voice recognition apparatuses may comprises a storage configured to store at least one of apparatus capability information and service domain information of all the voice recognition apparatuses connected via a network.

In accordance with an embodiment of the present invention, a voice recognition method comprises: by a first voice recognition apparatus among a plurality of voice recognition apparatuses connected via a network, receiving a voice signal from a user's speech; by the first voice recognition apparatus, determining information involved in the voice signal; by the first voice recognition apparatus, selecting a second voice recognition apparatus among the plurality of voice recognition apparatuses based on the information involved in the voice signal; transmitting the voice signal to the selected second voice recognition apparatus; by the second voice recognition apparatus, processing a request service involved in the voice signal; and by the second voice recognition apparatus, transmitting a result of processing the request service to the first voice recognition apparatus.

There may be further provided, by the first voice recognition apparatus, providing a result of performing the service from the second voice recognition apparatus to a user.

There may be further provided, by the plurality of voice recognition apparatuses, storing at least one of apparatus capability information and service domain information of all the voice recognition apparatuses connected via a network.

The first voice recognition apparatus may select the voice recognition apparatus for performing the request service, based on at least one of the service domain information and apparatus capability information.

When the second voice recognition apparatus cannot determine the information involved in the received voice signal, the voice signal is transmitted to the server, and the server determines the request service involved in the voice signal and receive the performed result.

In accordance with a first embodiment of the present invention, a recording medium is storing a program for performing the voice recognition method.

As described above, according to the present invention, it is possible to overcome a limited voice recognition distance caused by a physical characteristic of a microphone in a smart TV, a smart phone and the like voice recognition apparatus, and expand a spatial range where voice recognition is possible, thereby providing various voice recognition services to a user in more places.

Various IoTs have been used in home, and convenient systems using the smart phone and the like control device has been introduced. If it is possible to expand a space where the voice recognition is possible in home, more IoTs are easily and conveniently controllable through voice recognition.

The service functions of the used voice recognition are not individually used in respective apparatuses, but shared among the apparatuses, thereby providing more various voice recognition services.

Although an apparatus has fewer service domains provided based on the voice recognition, the apparatus can provide services of plentiful domains by sharing the functions between the apparatuses. Thus, a customer who wants to buy an voice recognition apparatus may prefer an apparatus supporting a network cluster with the voice recognition apparatuses.

DETAILED DESCRIPTION OF EXAMPLE EMBODIMENTS

Figure 1:
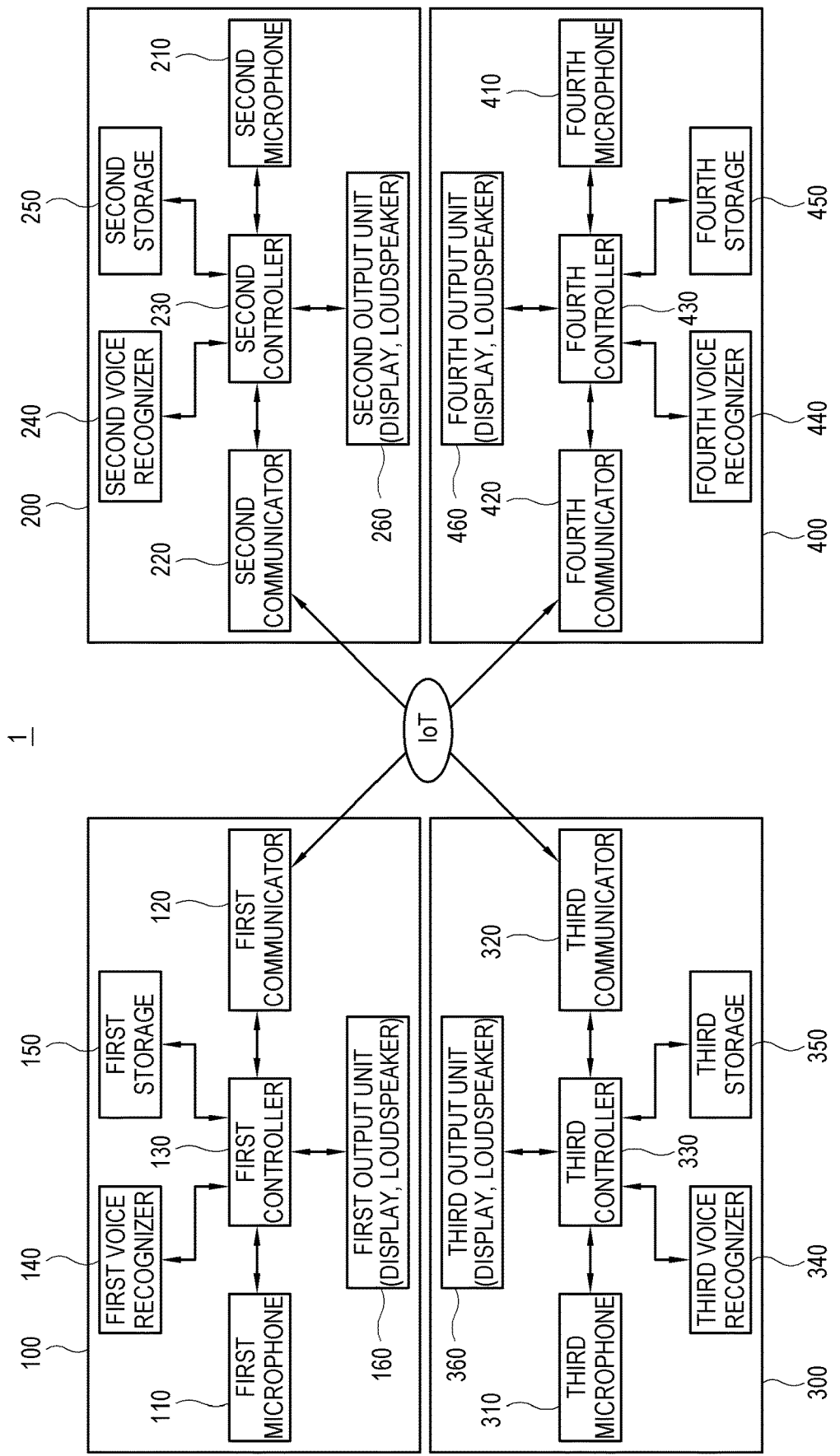
FIG. 1 is a block diagram of a voice recognition system according to a first embodiment of the present invention.

Below, embodiments of the present invention will be described with reference to accompanying drawings. The following embodiments have to be considered as illustrative only, and it should be construed that all suitable modification, equivalents and/or alternatives fall within the scope of the invention. Throughout the drawings, like numerals refer to like elements.

In this specification, "have," "may have," "include," "may include" or the like expression refers to presence of the corresponding features (e.g.: numerical values, functions, operations, or elements of parts, and does not exclude additional features.

In this specification, "A or B," "at least one of A or/and B," "one or more of A or/and B" or the like expression may involve any possible combination of listed elements. For example, "A or B," "at least one of A and B," or "at least one A or B" may refer all of (1) at least one A, (2) at least one B, or (3) both at least one A and at least one B.

In this specification, "a first," "a second," "the first," "the second" or the like expression may modify various elements regardless of order and/or importance, and does not limit the elements. These expressions may be used to distinguish one element from another element. For example, a first user device and a second user device are irrelevant to order or importance, and may be used to express different user devices. For example, a first element may be named a second element and vice versa without departing from the scope of the invention.

When a certain element (e.g. The first element) is "operatively or communicatively coupled with/to" or "connected to" a different element (e.g. second element), it will be understood that the certain element is directly coupled to the different element or coupled to the different element via another element (e.g. third element). On the other hand, when a certain element (e.g. The first element) is "directly coupled to" or "directly connected to" the different element (e. g. the second element), it will be understood that another element (e.g. the third element) is not interposed between the certain element and the different element.

In this specification, the expression of "configured to" may be for example replaced by "suitable for," "having the capacity to," "designed to," "adapted to," "made to," or "capable of" in accordance with circumstances. The expression of "configured to" may not necessarily refer to only "specifically designed to" in terms of hardware. Instead, the "device configured to" may refer to "capable of" together with other devices or parts in a certain circumstance. For example, the phrase of "the controller configured to perform A, B, and C" may refer to a dedicated controller (e.g. an embedded processor) for performing the corresponding operations, or a generic-purpose controller (e.g. a central processing unit (CPU) or an application processor) for performing the corresponding operations by executing one or more software programs stored in a memory device.

In this specification, terms may be used just for explaining a certain embodiment and not intended to limit the scope of other embodiments. A singular expression may involve a plural expression as long as it does not clearly give different meaning contextually. All the terms set forth herein, including technical or scientific terms, have the same meanings as those generally understood by a person having an ordinary skill in the art. Terms defined in a general-purpose dictionary may be construed to have the same or similar meanings as the contextual meanings of the related art, and should not be interpreted as ideally or excessively formal meanings. As necessary, even the terms defined in this specification may be not construed to exclude the embodiments of the present invention.

FIG. 1 is a block diagram of a voice recognition system 1 according to a first embodiment of the present invention.

Referring to FIG. 1, the voice recognition system 1 includes first to fourth voice recognition apparatuses 100, 200, 300 and 400 connected to a network cluster, for example, Internet of thing (IoT) in environments of a specific space such as a house, a structure, a building, an office, etc. FIG. 1 illustrates that the voice recognition system 1 includes four voice recognition apparatuses 100, 200, 300 and 400, but not limited thereto. Alternatively, the voice recognition system 1 may include two, three or not less than five voice recognition apparatuses. Here, four voice recognition apparatuses 100, 200, 300 and 400 are connected to each other via the IoT, and for example materialized by a refrigerator, a TV, a smart phone, an audio system, a computer, a washing machine, a microwave oven, a light, a vehicle, and the like having a voice recognition function. Below, for convenience of description, it will be described by way of example that the first voice recognition apparatus 100 is a refrigerator of which a wake-up word is set to 'Zipel', the second voice recognition apparatus 200 is a smart TV of which a wake-up word is set to 'Pavv', the third voice recognition apparatus 300 is set to a smart phone of which a wake-up word is set to 'Galaxy', and the fourth voice recognition apparatus 400 is an acoustic service device of which a wake-up word is set to 'Hive'.

The first voice recognition apparatus 100 includes a first microphone 110, a first communicator 120, a first controller 130, a first voice recognizer 140, a first storage 150 and a first output unit 160. Of course, the first voice recognition apparatus 100 may include elements other than the foregoing elements as the refrigerator.

The first microphone 110 receives a user's voice signal. The microphone 100 generates an electric signal based on vibration of a sound wave or ultrasound wave. The microphone 100 may for example include a carbon type, a crystal type, a dynamic type, a condenser type, a semiconductor type, etc.

The first communicator 120 is communicates with the first to fourth voice recognition apparatuses 200, 300 and 400 and transmits and receives various pieces of data, for example, a voice signal, a service processing result, etc. The first communicator 120 may include a wireless Internet module for 2G, 3G, 4G, long term evolution (LTE), and the like mobile communication, wireless broadband (Wibro), world interoperability for microwave access (Wimax), high speed downlink packet access (HSDPA), etc.; and a near field communication (NFC) module for radio frequency identification (RFID), infrared data association (IrDA), ultra wideband (UWB), ZigBee, etc.

The first controller 130 generally controls the elements of the first voice recognition apparatus 100, for example, the first microphone 110, the first communicator 120, the first voice recognizer 140, the first storage 150, and the first output unit 160. The first controller 130 is materialized by a control board including a central processing unit (CPU), a micro-processing unit (MPU), application specific integrated circuits (ASICs), digital signal processors (DSPs), digital signal processing devices (DSPDs), programmable logic devices (PLDs), field programmable gate arrays (FPGAs), micro-controllers, a microprocessor, etc. The first controller 130 may include not only hardware but also software such as an operating system (OS) of the first voice recognition apparatus 100. The first controller 130 processes a service requested by a user included in the voice signal received through the first microphone 110 or the first communicator 120, and provides the processing results to a user through the first output unit 160 or transmits the processing results to another voice recognition apparatus that transmits the voice signal through the first communicator 120.

The first voice recognizer 140 functions to receive the voice signal and perform the voice recognition process. The voice recognition function refers to a series of processes for converting the voice signal into language data, and the first voice recognizer 140 may convert a voice signal into language data in accordance with various publicly known voice recognition methods, and output the language data. Meanwhile, the voice signal received though the first microphone 110 may include various kinds of noise in addition to a user's voice targeted for voice recognition, and be thus subjected to a frequency analysis or the like preprocess so that only a user's voice component can be extracted and the extracted voice component can be subjected to a voice recognition process. The first voice recognizer 140 may be materialized by the voice recognition engine. Since various voice recognition methods of using the voice recognition engine have been publicly known, descriptions thereof will be omitted.

The first voice recognizer 140 may be materialized by an embedded type engine provided inside the first voice recognition apparatus 100, may be materialized by separate hardware, or may be materialized by software to be run by the first controller 130. Such an embedded type engine is capable of recognizing only a fixed number of specific words. For example, when the first voice recognition apparatus 100 is materialized as the refrigerator, the first voice recognizer 140 may be used for recognizing a user's voice input for controlling the refrigerator. The services provided by the refrigerator to a user may include a recipe, temperature information about a refrigerator compartment or freezer compartment, information about food preservation, etc. When a user makes a voice input such as 'Zipel, increase a first refrigerator compartment temperature by one degree', 'Zipel, turn off the second refrigerator compartment', 'Zipel, let me know a low-fat recipe', 'Zipel, let me know a recipe related to preserved food', 'Zipel, let me know food to buy', etc., the first voice recognizer 140 recognizes a voice signal and determines information about a service requested by the user or a user's command (below, referred to as a 'request service'). Here, 'Zipel' is a wake-up word for identifying a target to which a request for a service is made, i.e. the refrigerator. In this case, the first voice recognizer 140 may recognize the wake-up word of 'Zipel' from a user's speech and determines that the apparatus requested for the service is the first voice recognition apparatus 100 (i.e. the refrigerator). Like this, the first voice recognition apparatus 100 (i.e. the refrigerator) is specialized to recognize only its own service domain, i.e. a recipe, temperature information about a refrigerator compartment or freezer compartment, information about food preservation, etc.

When a user makes an input to the microphone 110 of the first voice recognition apparatus 100 (i.e. the refrigerator) such as 'Galaxy, show me a real-time soap opera' or 'Galaxy, play my favorite music' in order to watch the soap opera or listen to music while doing work a kitchen where the refrigerator is placed, the voice recognizer 140 analyzes a voice signal of a speech and determines a wake-up word of 'Galaxy'. In this case, the voice recognizer 140 informs the first controller 130 that the determined wake-up word is 'Galaxy'. The first controller 130 transmits the voice signal to the third voice recognition apparatus 300 (i.e. the smart phone) corresponding to 'Galaxy' through the first communicator 120. The first voice recognition apparatus 100 includes the service domain specialized for the refrigerator, but the first voice recognizer 140 may have a language recognition capability limited to only the refrigerator, or a language recognition capability related to the smart TV, the smart phone, the acoustic service device, and the like connected to the network. When the first voice recognizer 140 has the language recognition capability limited to only the refrigerator, the first voice recognizer 140 cannot recognize any sentence other than the wake-up word of 'Galaxy' from a user's speech such as 'Galaxy, show me a real-time soap opera' or 'Galaxy, play my favorite music', and thus transmits the received voice signal directly to the third voice recognition apparatus 300. When the voice recognizer 140 has the language recognition capability related to the smart TV, the smart phone, the acoustic service device, and the like connected to the network, the first voice recognizer 140 recognizes not only the wake-up word but also the sentence and thus determines the service requested by a user involved in the voice signal. Thus, the first controller 130 can transmit the determined information about the request service rather than the voice signal.

A user's speech does not have to essentially include the wake-up word. When there are no wake-up words, the information about the request service included in the voice signal may be determined to select another voice recognition apparatus capable of providing the request service. In this case, the first voice recognition apparatus 100 may be storing information about the service domains such as the smart TV, the smart phone, the acoustic service device, etc. connected via the network and information about the apparatus capabilities in the first storage 150 and then select the apparatus capable of providing the service.

When the voice recognizer 140 cannot recognize a user's voice signal, the voice signal is transmitted to all the smart TV, the smart phone, and the acoustic service device connected via the network. In this case, the smart TV, the smart phone or the acoustic service device receives the voice signal, determines whether it is recognizable, recognizes the voice signal when it is determined that the voice signal is recognizable, and transmits a service result to the first voice recognition apparatus 100 that has transmitted the voice signal. When the smart TV, the smart phone or the acoustic service device cannot recognize the received voice signal, it determines the voice signal as an irrelevant voice signal and terminates operation.

The first storage 150 is configured to store data without limitations. The first storage 150 is accessed by the first controller 130 and the first voice recognizer 140 to perform reading, recording, modifying, deleting, updating, etc. with regard to the data. The data stored in the first storage 150 may for example include data related to the wake-up word, information about the capabilities of other voice recognition apparatuses connected to the first voice recognition apparatus 100 via the network (as well as information about an output device), information about the service domains, etc. Of course, the first storage 150 includes an operating system (OS), various applications executable on the OS, software, image data, appended data, etc.

The first storage 150 may include at least one of storage media such as a flash memory type, a hard disk type, a multimedia card micro type, a card type (e.g. SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The first output unit 160 provides information, i.e. a service process result to a user. The first output unit 160 is materialized by a display, a loudspeaker, etc. In a case of the refrigerator, a middle-sized display and a small loudspeaker may be mounted to the refrigerator.

The second voice recognition apparatus 200 includes a second microphone 210, a second communicator 220, a second controller 230, a second voice recognizer 240, a second storage 250 and a second output unit 260. Of course, the second voice recognition apparatus 200 may include elements other than the foregoing elements as the smart TV. The second voice recognition apparatus 200 materialized as the smart TV recognizes a voice signal received through the second microphone 210 or the second communicator 220 and processes a request for the service related to the smart TV included in the voice signal. When the voice signal is received through the second microphone 210, the processed service result is provided to a user through the second output unit 260, for example, through the display and the loudspeaker. When the voice signal is received from a different voice recognition apparatus through the second communicator 220, the processed service result is transmitted to the different voice recognition apparatus through the second communicator 220.

The third voice recognition apparatus 300 includes a third microphone 310, a third communicator 320, a third controller 330, a third voice recognizer 340, a third storage 350 and a third output unit 360. Of course, the third voice recognition apparatus 300 may include elements other than the foregoing elements as the smart phone. The third voice recognition apparatus 300 materialized as the smart phone recognizes a voice signal received through the third microphone 310 or the third communicator 320 and processes a request for the service related to the smart phone included in the voice signal. When the voice signal is received through the third microphone 310, the processed service result is provided to a user through the third output unit 360, for example, through the display and the loudspeaker. When the voice signal is received from a different voice recognition apparatus through the third communicator 320, the processed service result is transmitted to the different voice recognition apparatus through the third communicator 320.

The fourth voice recognition apparatus 400 includes a fourth microphone 410, a fourth communicator 420, a fourth controller 430, a fourth voice recognizer 440, a fourth storage 450 and a fourth output unit 460. Of course, the fourth voice recognition apparatus 400 may include elements other than the foregoing elements as the acoustic service device. The fourth voice recognition apparatus 400 materialized as the acoustic service device recognizes a voice signal received through the fourth microphone 410 or the fourth communicator 420 and processes a request for the service related to the acoustic service device included in the voice signal. When the voice signal is received through the fourth microphone 410, the processed service result is provided to a user through the fourth output unit 460, for example, through the loudspeaker. When the voice signal is received from a different voice recognition apparatus through the second communicator 420, the processed service result is transmitted to the different voice recognition apparatus through the fourth communicator 420.

The first to fourth voice recognition apparatuses 100, 200, 300 and 400 have their own service domains and processing capabilities, respectively. For example, the first voice recognition apparatus 100 materialized as the refrigerator may have service domains of providing a recipe, providing temperature information about a refrigerator compartment or freezer compartment, providing information about food preservation, etc., and the second to fourth voice recognition apparatuses 200, 300 and 400 connected thereto via the network have information about these service domains. The second voice recognition apparatus 200 materialized as the smart TV may have service domains of providing information about a broadcast channel, content search, control function, scheduling a broadcasting program, etc., and the first, third and fourth voice recognition apparatuses 100, 300 and 400 connected thereto via the network have information about these service domains. The third voice recognition apparatus 300 materialized as the smart phone may have service domains of making a phone call, providing weather information, searching a news article, setting an alarm, playing music, etc., and the first, second and fourth voice recognition apparatuses 100, 200 and 400 connected thereto via the network have information about these service domains. The fourth voice recognition apparatus 400 materialized as the acoustic service device may have service domains of playing music, reading an audio book, knowledge search, etc., and the first to third voice recognition apparatuses 100, 200 and 300 connected thereto via the network may have information about these service domains.

The first to fourth voice recognition apparatuses 100, 200, 300 and 400 include their own output units 160, 260, 360 and 460. For example, the first voice recognition apparatus 100 materialized as the refrigerator includes a loudspeaker and a middle-sized display. The second voice recognition apparatus 200 materialized as the smart TV includes a loudspeaker and a large-sized display. The third voice recognition apparatus 300 materialized as the smart phone includes a loudspeaker and a small-sized display. The fourth voice recognition apparatus 400 materialized as the acoustic service device includes only a loudspeaker without a display.

Figure 2:
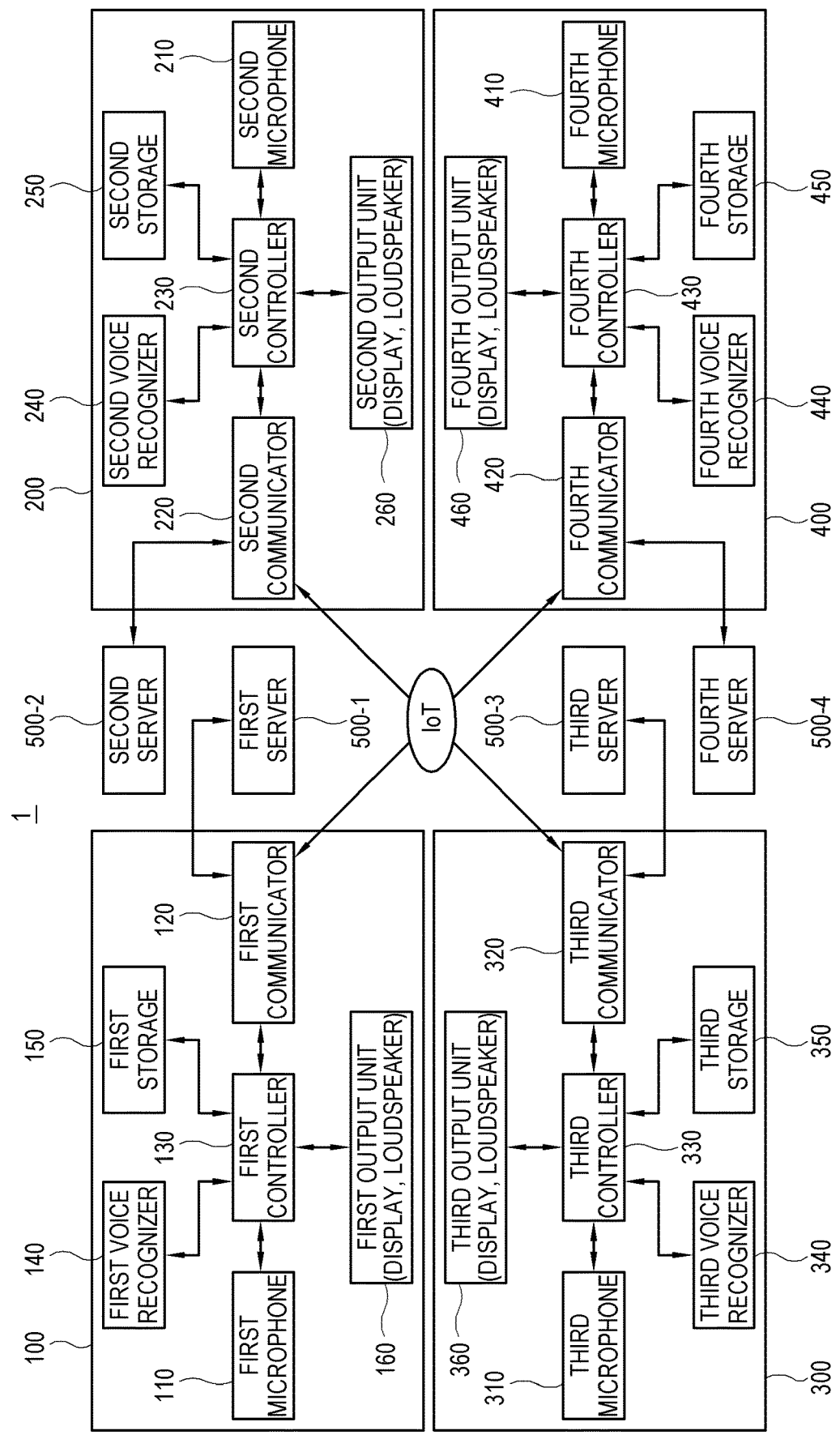
FIG. 2 is a block diagram of a voice recognition system according to a second embodiment of the present invention.

FIG. 2 is a block diagram of a voice recognition system 1 according to a second embodiment of the present invention. In the voice recognition system 1 of FIG. 2, the first to fourth voice recognition apparatuses 100~400 are similar to those of FIG. 1, and repetitive descriptions will be avoided. In this embodiment, servers 500-1, 500-2, 500-3 and 500-4 respectively connected to the first to fourth voice recognition apparatuses 100~400 are employed since the first to fourth voice recognition apparatuses 100~400 lack capabilities of processing the request service or their first to fourth voice recognizers 140, 240, 340 and 440 lack their capabilities. In this case, the first to fourth voice recognition apparatuses 100~400 have only to recognize the wake-up word. In the voice recognition system 1 according to the second embodiment, all the first to fourth voice recognition apparatuses 100~400 do not have to use the server in processing the voice recognition or the request service. For example, the server 500-3 may be omitted since the voice recognition apparatus 300 materialized as the smart phone has sufficient voice recognition capability and sufficient service processing capability.

Figure 3:
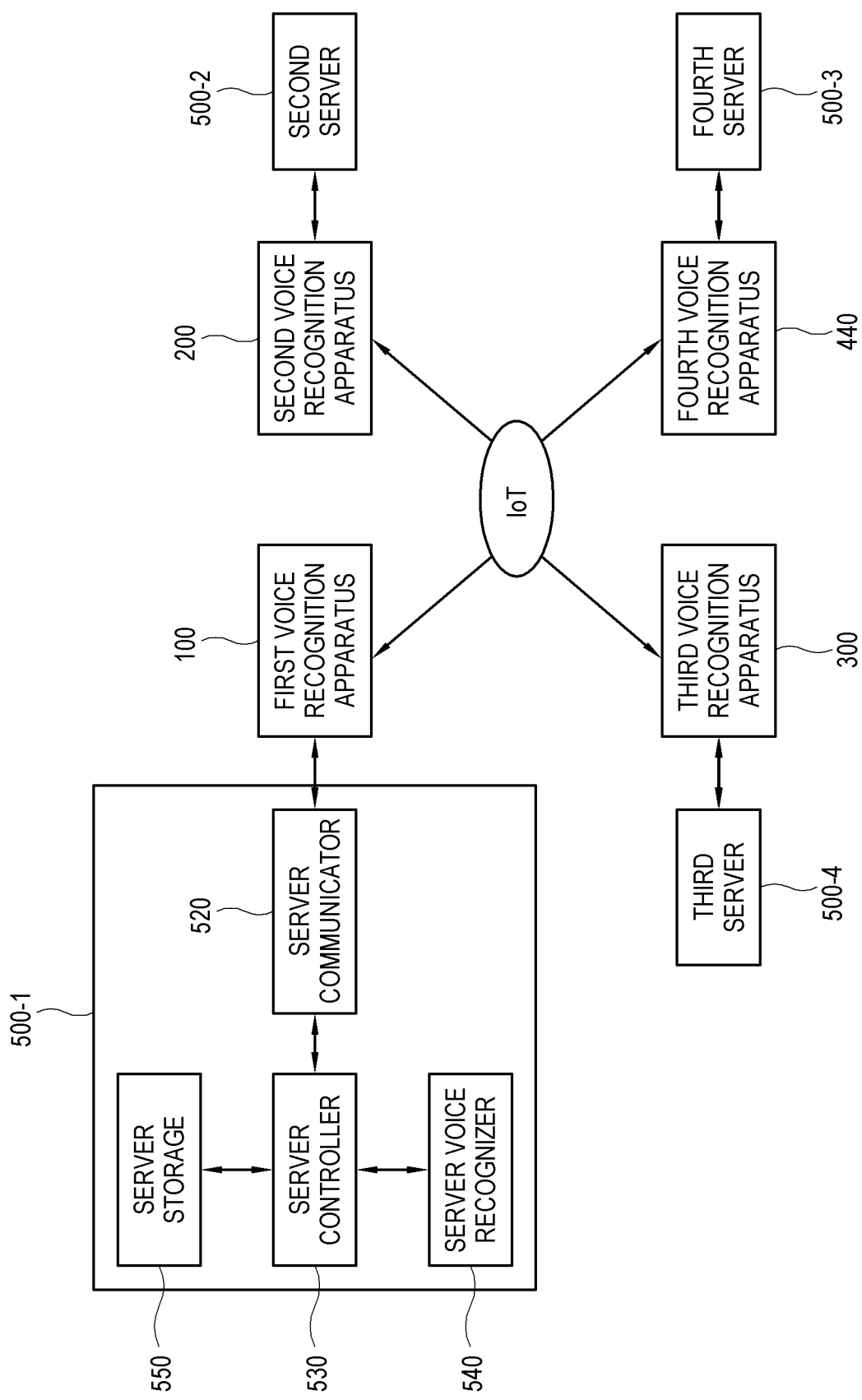
FIG. 3 is a block diagram of a server according to the second embodiment of the present invention.

FIG. 3 is a block diagram of illustrating a basic configuration of the first server 500-1. As shown in FIG. 3, the first server 500-1 includes a server communicator 520, a server controller 530, a server voice recognizer 540, and a server storage 550. In FIG. 3, each configuration of the second to fourth servers 500-2, 500-3 and 500-4 is similar to that of the first server 500-1, and thus repetitive descriptions thereof will be avoided.

The server communicator 520 receives a voice signal from the connected voice recognition apparatus 100. The server communicator 520 may employ data communication such as very high bit rate digital subscriber line (VDSL), Ethernet, token ring, high definition multimedia interface (HDMI), universal serial bus (USB), Component, LVDS, HEC, etc.; mobile communication such as 2G, 3G, 4G, LTE, etc.; wireless Internet technology such as a wireless local area network (WLAN), wireless fidelity (Wi-Fi), Wibro, Wimax, HSDPA, etc.; NFC technology such as Bluetooth, RFID, IrDA, UWB, ZigBee, etc.

The server controller 530 controls the elements of the server. The server controller 530 processes a service requested in a received and recognized voice signal and then provides the processed service to the voice recognition apparatus 100 through the server communicator 520. The server controller 530 is materialized by a control board including a CPU, a MPU, ASICs, DSPs, DSPDs, PLDs, FPGAs, micro-controllers, a microprocessor, etc. The server controller 530 may include not only hardware but also software such as an OS.

The server voice recognizer 540 may be materialized by a voice recognition engine. The voice recognition engine may be materialized by an embedded type engine, may be materialized by separate hardware, or may be materialized by software to be run by the server controller 530. Such an embedded type engine is capable of recognizing only a fixed number of specific words. For example, when the first voice recognition apparatus 100 is materialized as the refrigerator, the server voice recognizer 540 may be used for recognizing a user's voice input for controlling the refrigerator.

The server storage 550 may be for example configured to store data to be used in the server voice recognizer 540. The server storage 550 is storing information about data of results from processing a service requested in a voice signal. Of course, the server storage 550 is storing the OS, various applications executable on the OS, software, image data, appended data, etc.

Below, a voice recognition method according to the present invention will be described in detail with reference to FIGS. 4 to 6. The voice recognition method is classified into a method in which a voice recognizer recognizes a wake-up word and designates a voice recognition apparatus when a voice signal of a user's speech includes the wake-up word (refer to FIG. 4), a method in which a voice recognizer determines information about a request service included in a voice signal and designates a voice recognition apparatus based on the information about the request service when a voice signal of a user's speech includes no wake-up word (refer to FIG. 5), a method in which a voice recognizer recognizes a voice corresponding to service domains of all connected voice recognition apparatuses and transmits an unprocessable recognized voice to all the voice recognition apparatuses connected to the network when a voice signal of a user's speech includes no wake-up word (refer to FIG. 6), and a method in which a voice recognizer recognizes only a voice corresponding to its own service domain and transmits a request service, of which voice recognition is impossible, to all the voice recognition apparatuses connected to the network when a voice signal of a user's speech includes no wake-up word (refer to FIG. 7).

Figure 4:
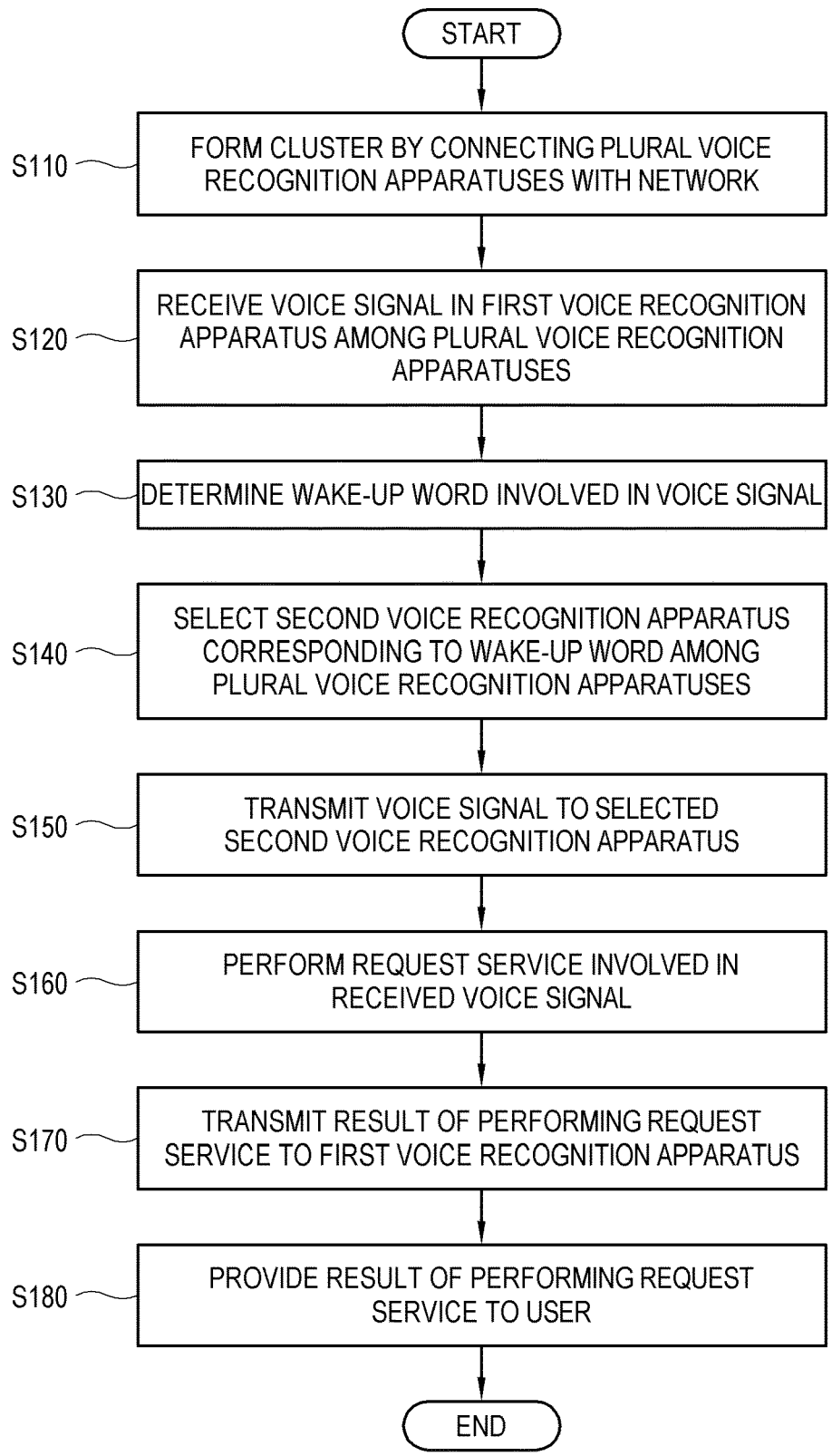
FIG. 4 is a flowchart of a voice recognition method according to the first embodiment of the present invention.

FIG. 4 is a flowchart of a voice recognition method according to the first embodiment of the present invention.

At operation S110, a plurality of voice recognition apparatuses placed in a specific space, for example, a house are connected via an IoT to thereby configure a cluster.

At operation S120, one (hereinafter, referred to as a 'first voice recognition apparatus') among the plurality of voice recognition apparatuses receives a voice signal from a user. Here, the voice signal includes a wake-up word corresponding to a voice recognition apparatus (hereinafter, referred to as a 'second voice recognition apparatus'), to which a user makes a request for a service or function control, among the plurality of voice recognition apparatuses. For example, when a user wants to watch a soap opera through a display mounted to a refrigerator, the user makes a request of 'Pavv, show me a soap opera' through a microphone of the refrigerator.

At operation S130, the voice recognizer of the first voice recognition apparatus determines the wake-up word involved in the voice signal. For example, the wake-up word of 'Pavv' is extracted from 'Pavv, show me a soap opera'.

At operation S140, the controller of the first voice recognition apparatus selects the second voice recognition apparatus corresponding to 'Pavv' among the plurality of voice recognition apparatuses.

At operation S150, the communicator of the first voice recognition apparatus transmits the voice signal to the second voice recognition apparatus corresponding to 'Pavv'.

At operation S160, the voice recognizer of the second voice recognition apparatus determines a request service included in the voice signal and processes the service. When there are no concrete instructions for the soap opera, a list of soap operas is transmitted to the first voice recognition apparatus. When a specific soap opera is designated in the voice signal, the text operation starts.

At operation S170, when a user selects one of the listed soap operas through the first voice recognition apparatus, soap-opera selection information is transmitted to the second voice recognition apparatus, and the second voice recognition apparatus transmits the selected soap opera to the first voice recognition apparatus by a streaming or downloading method. Here, the second voice recognition apparatus provides suitable soap opera data on assumption that the capability of the first voice recognition apparatus and the specification of the output unit. For example, when the first voice recognition apparatus has a small memory capacity, the soap opera image data is streamed by selecting low picture quality or high picture quality. When the first voice recognition apparatus includes no display, only audio data is separately transmitted.

At operation S180, the first voice recognition apparatus outputs the received soap opera to the display and/or the loudspeaker, thereby providing the soap opera to a user.

Thus, when a user adds the wake-up word corresponding to the desired voice recognition apparatus to a voice command, the voice recognizer of each voice recognition apparatus has only to recognize its own service domain, thereby improving accuracy of recognition.

Figure 5:
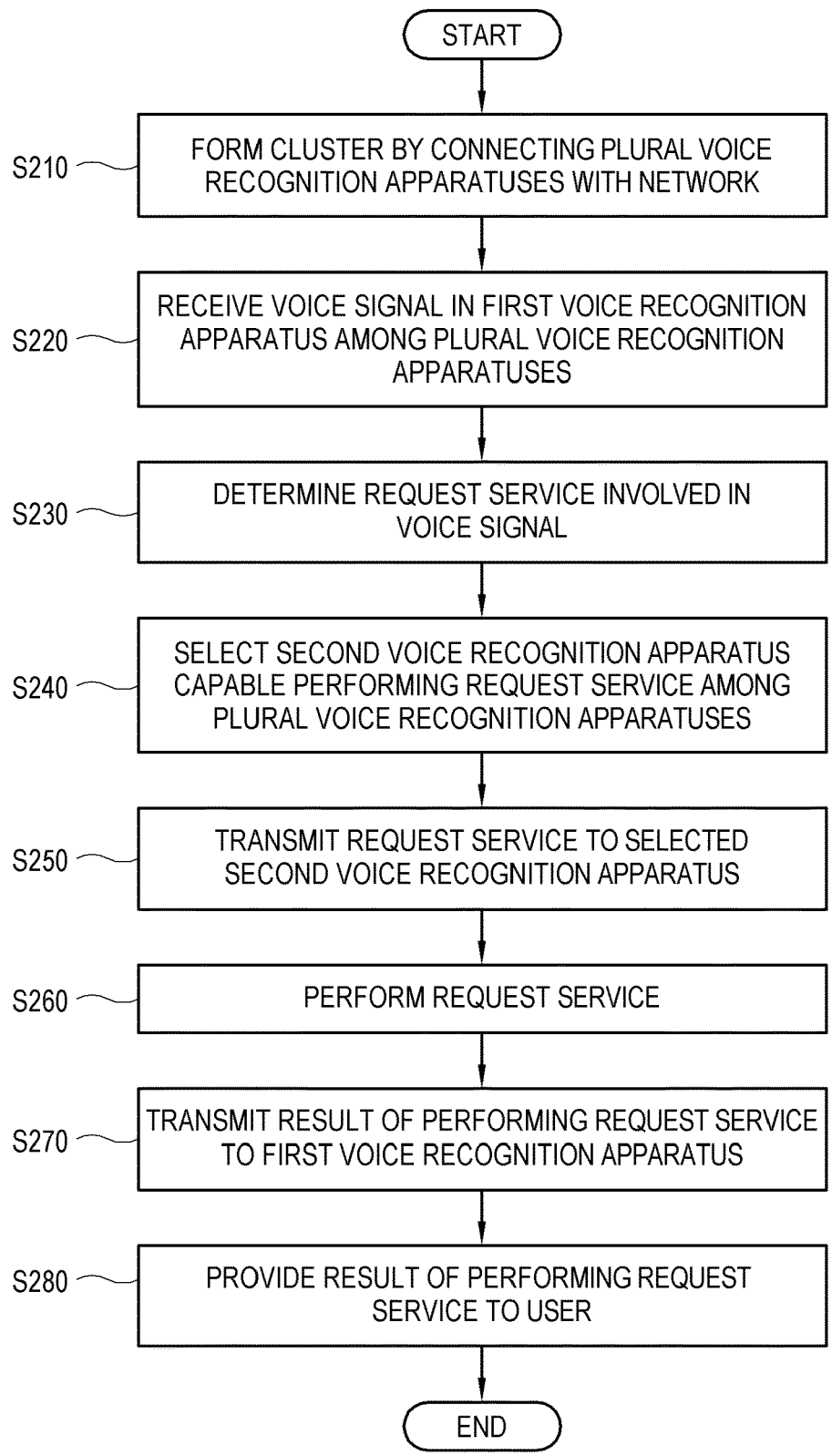
FIG. 5 is a flowchart of a voice recognition method according to the second embodiment of the present invention.

FIG. 5 is a flowchart of a voice recognition method according to the second embodiment of the present invention.

At operation S210, a plurality of voice recognition apparatuses placed in a specific space, for example, a house are connected via an IoT to thereby configure a cluster.

At operation S120, one (i.e. the 'first voice recognition apparatus') among the plurality of voice recognition apparatuses receives a voice signal from a user. Here, the voice signal does not include a wake-up word corresponding to a voice recognition apparatus (i.e. the 'second voice recognition apparatus'), to which a user makes a request for a service or function control, among the plurality of voice recognition apparatuses. For example, when a user wants to watch a soap opera through a display mounted to a refrigerator, the user makes a request of 'Show me a soap opera' through a microphone of the refrigerator.

At operation S230, the voice recognizer of the first voice recognition apparatus determines the request service involved in the voice signal. For example, the service domain of a 'soap-opera providing service' is extracted from 'Show me a soap opera'.

At operation S240, the controller of the first voice recognition apparatus selects the second voice recognition apparatus capable of processing the soap-opera providing service among the plurality of voice recognition apparatuses. Here, to select the second voice recognition apparatus, information about the service domain of the second voice recognition apparatus is stored in the storage of the first voice recognition apparatus, and the determined service domain is compared with the service domain stored in the storage, thereby selecting the second voice recognition apparatus having the matching service domain. Of course, when the plurality of voice recognition apparatuses are available with regard to the service domain, the plurality of voice recognition apparatuses may be all selected or may be selected based non priority.

At operation S250, the communicator of the first voice recognition apparatus transmits the voice signal or the request service information to the selected second voice recognition apparatus.

At operation S260, when the voice signal is received, the voice recognizer of the second voice recognition apparatus determines a request service included in the voice signal and processes the service. When the request service information is received, the service is directly processed. When there are no concrete instructions for the soap opera, a list of soap operas is transmitted to the first voice recognition apparatus. When a specific soap opera is designated, the text operation starts.

At operation S270, when a user selects one of the listed soap operas through the first voice recognition apparatus, soap-opera selection information is transmitted to the second voice recognition apparatus, and the second voice recognition apparatus transmits the selected soap opera to the first voice recognition apparatus by a streaming or downloading method. Here, the second voice recognition apparatus provides suitable soap opera data on assumption that the capability of the first voice recognition apparatus and the specification of the output unit. For example, when the first voice recognition apparatus has a small memory capacity, the soap opera image data is streamed by selecting low picture quality or high picture quality. When the first voice recognition apparatus includes no display, only audio data is separately transmitted.

At operation S280, the first voice recognition apparatus outputs the received soap opera to the display and/or the loudspeaker, thereby providing the soap opera to a user.

Thus, in the voice recognition method according to the second exemplary embodiment, it is possible to determine a service requested by a user and select the second voice recognition apparatus capable of properly processing the service only when all the plurality of voice recognition apparatuses connected via the network can recognize the sentence from the voice signal based on a user's speech.

Figure 6:
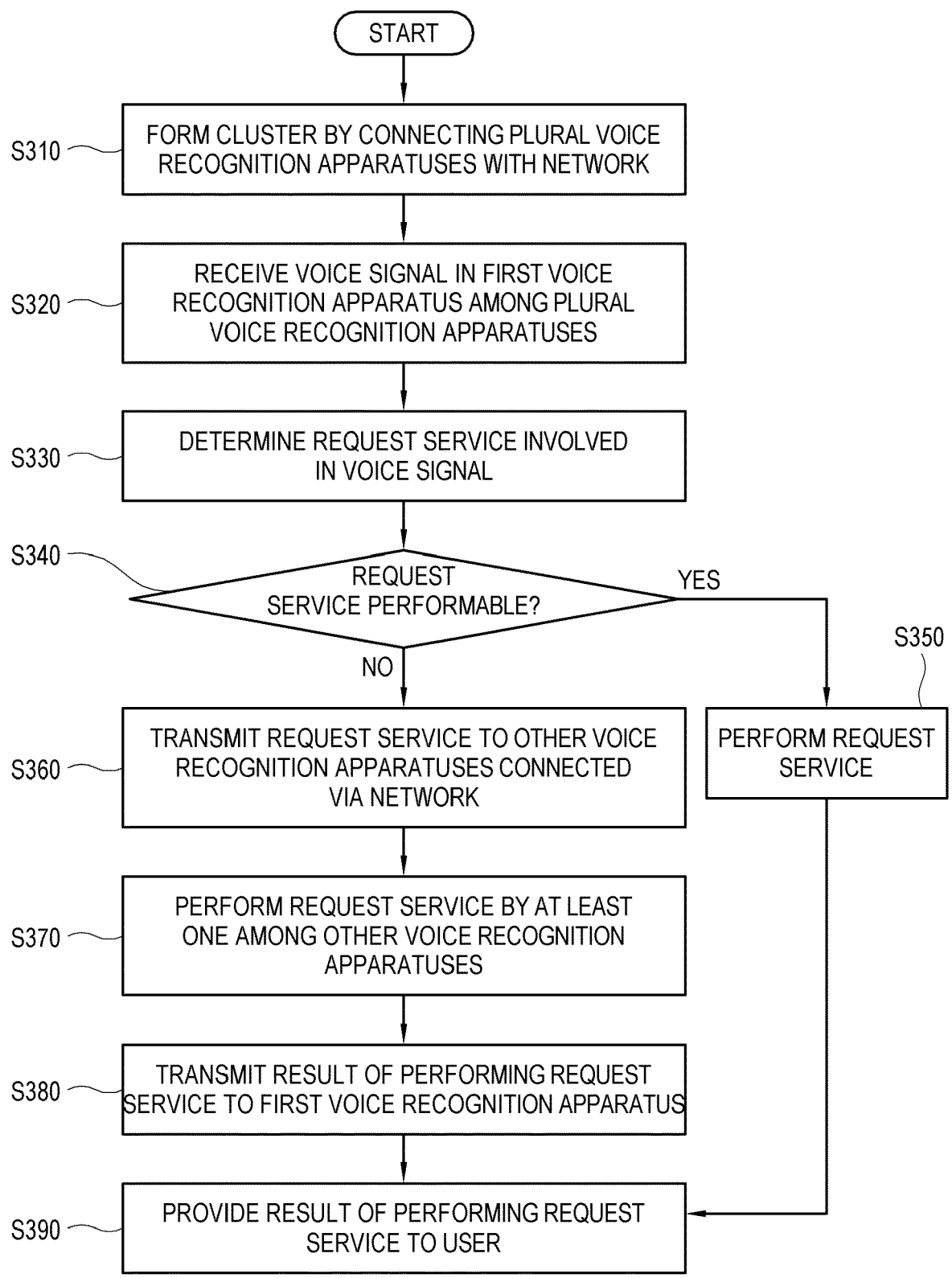
FIG. 6 is a flowchart of a voice recognition method according to a third embodiment of the present invention.

FIG. 6 is a flowchart of a voice recognition method according to a third embodiment of the present invention.

At operation S310, a plurality of voice recognition apparatuses placed in a specific space, for example, a house are connected via an IoT to thereby configure a cluster.

At operation S320, one (i.e. the 'first voice recognition apparatus') among the plurality of voice recognition apparatuses receives a voice signal from a user. Here, the voice signal does not include a wake-up word corresponding to a voice recognition apparatus (i.e. the 'second voice recognition apparatus'), to which a user makes a request for a service or function control, among the plurality of voice recognition apparatuses. For example, when a user wants to watch a soap opera through a display mounted to a refrigerator, the user makes a request of 'Show me a soap opera' through a microphone of the refrigerator.

At operation S330, the voice recognizer of the first voice recognition apparatus determines the request service involved in the voice signal. For example, the service domain of a 'soap-opera providing service' is extracted from 'Show me a soap opera'.

At operation S340, the first voice recognition apparatus determines whether the determined request service is processible.

When the request service is processible, the request service is processed at operation S350, and a service process result is provided to a user through a display or loudspeaker at operation S390.

On the other hand, when the request service is not processible, at operation S360 the controller of the first voice recognition apparatus transmits a service process request or the voice signal to all other voice recognition apparatuses connected via the network.

At operation S370, all other voice recognition apparatuses connected via the network determine whether the service process request is processible, and terminates operation when the service is not processible or processes the service when the service is processible. When the voice signal is received, the service request involved in the voice signal is determined. The operation is terminated when it is impossible to determine the service request. When it is possible to determine the service request, it is determined whether the service is processible. When the service is processible, the service is processed. When there are no concrete instructions for the soap opera in the request service information, a list of soap operas is transmitted to the first voice recognition apparatus. When a specific soap opera is designated, the text operation starts.

At operation S380, when a user selects one of the listed soap operas through the first voice recognition apparatus, soap-opera selection information is transmitted to the second voice recognition apparatus, and the second voice recognition apparatus transmits the selected soap opera to the first voice recognition apparatus by a streaming or downloading method. Here, when the service process result is transmitted, suitable soap opera data is provided on assumption that the capability of the first voice recognition apparatus and the specification of the output unit. For example, when the first voice recognition apparatus has a small memory capacity, the soap opera image data is streamed by selecting low picture quality or high picture quality. When the first voice recognition apparatus includes no display, only audio data is separately transmitted.

At operation S390, the first voice recognition apparatus outputs the received soap opera to the display and/or the loudspeaker, thereby providing the soap opera to a user.

Thus, in the voice recognition method according to the third exemplary embodiment, when the plurality of voice recognition apparatuses connected via the network respectively have capabilities of processing the services limited to their own service domains and it is thus difficult to process the service requested in the voice signal based on a user's speech, a request for processing the service may be made to all the connected voice recognition apparatuses.

Figure 7:
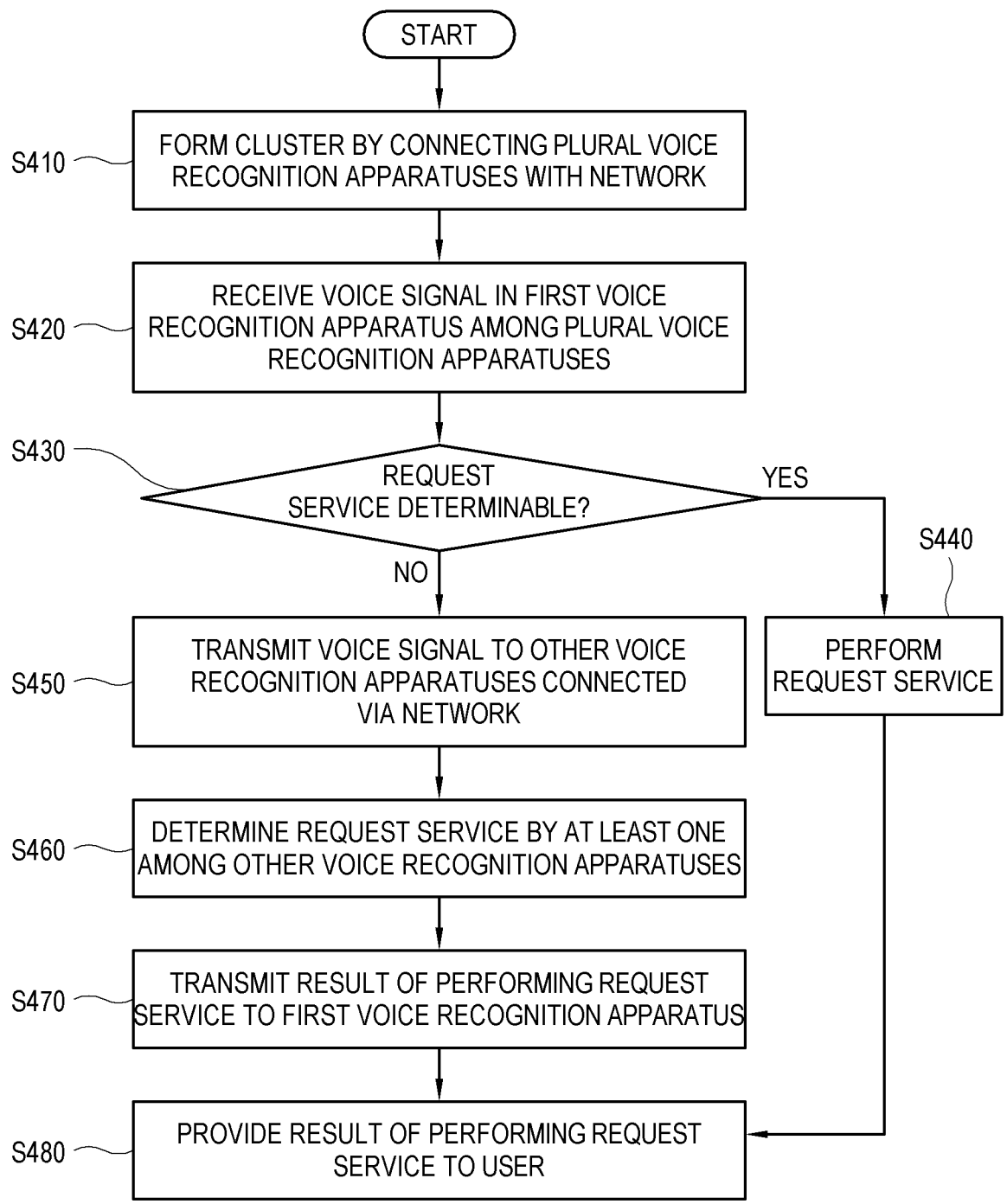
FIG. 7 is a flowchart of a voice recognition method according to a fourth embodiment of the present invention.

FIG. 7 is a flowchart of a voice recognition method according to a fourth embodiment of the present invention.

At operation S410, a plurality of voice recognition apparatuses placed in a specific space, for example, a house are connected via an IoT to thereby configure a cluster.

At operation S420, one (i.e. the 'first voice recognition apparatus') among the plurality of voice recognition apparatuses receives a voice signal from a user. Here, the voice signal does not include a wake-up word corresponding to a voice recognition apparatus (i.e. the 'second voice recognition apparatus'), to which a user makes a request for a service or function control, among the plurality of voice recognition apparatuses. For example, when a user wants to watch a soap opera through a display mounted to a refrigerator, the user makes a request of 'Show me a soap opera' through a microphone of the refrigerator.

At operation S430, the voice recognizer of the first voice recognition apparatus determines the request service involved in the voice signal. For example, the service domain of a 'soap-opera providing service' is extracted from 'Show me a soap opera'.

When the request service is determinable, the request service is processed at operation S440, and a service process result is provided to a user through a display or loudspeaker at operation S480. Here, the first voice recognition apparatus is also capable of processing the service as long as it can determine the request service from the voice signal.

On the other hand, when the request service is not determinable, at operation S450 the controller of the first voice recognition apparatus transmits the voice signal to all other voice recognition apparatuses connected via the network.

At operation S460, all other voice recognition apparatuses connected via the network determine whether the request service is processible, and terminates operation when the service is not processible. When the service is processible, the request service is processed. When there are no concrete requests for the soap opera in the request service information, a list of soap operas is transmitted to the first voice recognition apparatus. When a specific soap opera is designated, the text operation starts.

At operation S470, when a user selects one of the listed soap operas through the first voice recognition apparatus, soap-opera selection information is transmitted to the second voice recognition apparatus, and the second voice recognition apparatus transmits the selected soap opera to the first voice recognition apparatus by a streaming or downloading method. Here, when the service process result is transmitted, suitable soap opera data is provided on assumption that the capability of the first voice recognition apparatus and the specification of the output unit. For example, when the first voice recognition apparatus has a small memory capacity, the soap opera image data is streamed by selecting low picture quality or high picture quality. When the first voice recognition apparatus includes no display, only audio data is separately transmitted.

At operation S480, the first voice recognition apparatus outputs the received soap opera to the display and/or the loudspeaker, thereby providing the soap opera to a user.

Thus, in the voice recognition method according to the third exemplary embodiment, when the plurality of voice recognition apparatuses connected via the network respectively have capabilities of processing the services limited to their own service domains in the voice signal based on a user's speech, a request for processing the service may be made to all the connected voice recognition apparatuses.

Figure 8:
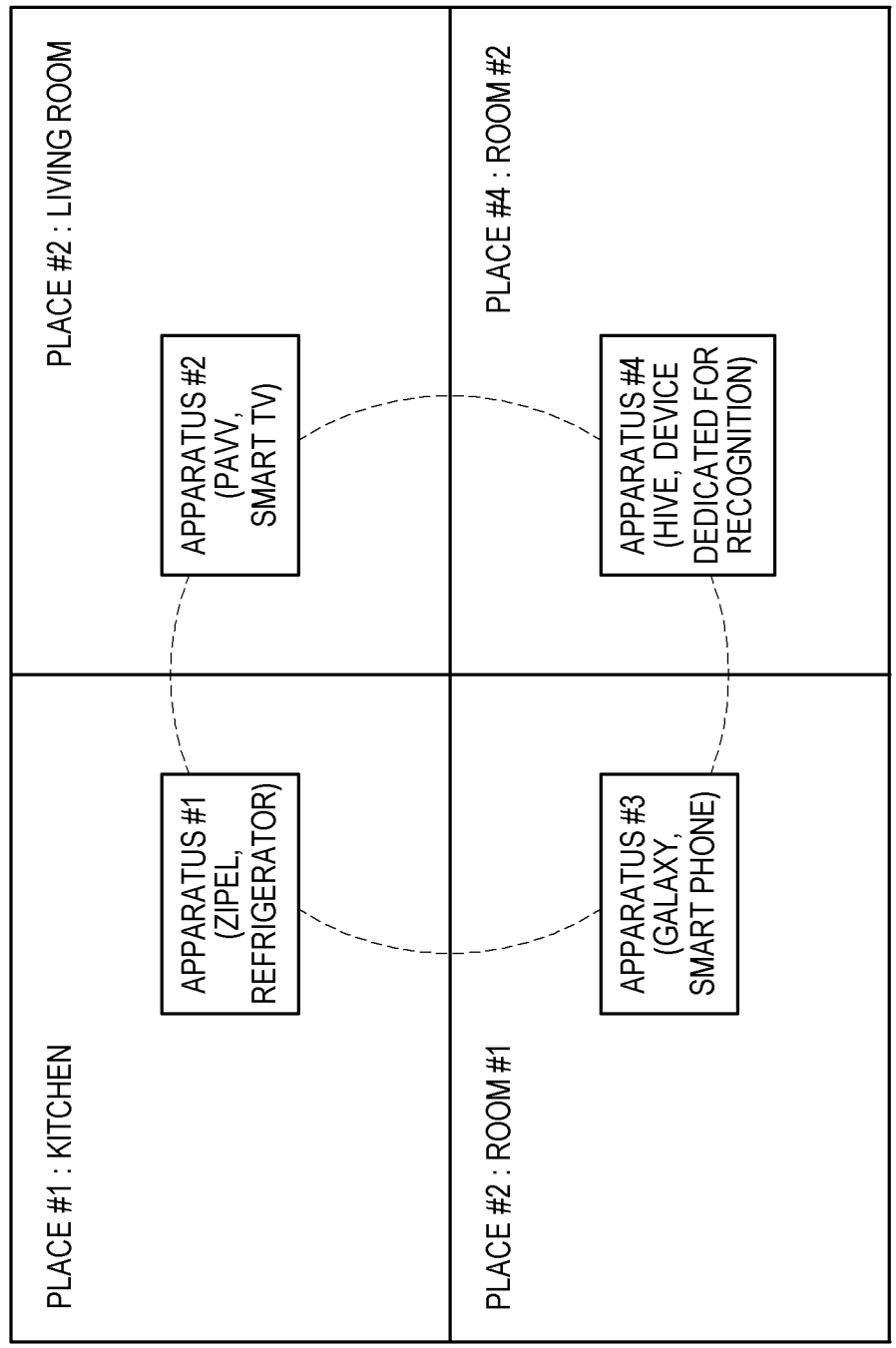
FIGS. 8, 9, 10, 11, and 12 are schematic views of illustrating scenarios based on voice recognition methods according to the present invention.

FIG. 8 is a schematic view of illustrating a service scenario based on the voice recognition system 1 according to one embodiment of the present invention. The plurality of voice recognition apparatuses share their own functions (recognizable service domains), capabilities, wake-up words, output device information, etc. with one another through the network.

The apparatus #1 is a refrigerator placed in a kitchen and capable of recognizing a voice, and is called 'Zipel' as a wake-up word. The apparatus #1 may have service domains such as a recipe, temperature information about a refrigerator compartment or freezer compartment, information about food preservation, refrigerator temperature control, refrigerator function control, etc. The apparatus #1 may include a loudspeaker and a middle-sized display as the output devices.

The apparatus #2 is a smart TV placed in a living room and capable of recognizing a voice, and is called 'Pavv' as a wake-up word. The apparatus #2 may have service domains such as broadcast channel information, content search, a control function (channel up/down, power on/off, etc.), broadcast program scheduling, image transfer, etc. The apparatus #2 may include a loudspeaker and a large-sized display as the output devices.

The apparatus #3 is a smart phone left in a room #1 and capable of recognizing a voice, and is called 'Galaxy' as a wake-up word. The apparatus #3 may have service domains such as a phone call, weather information, news article search, alarm setting, music play, etc. The apparatus #2 may include a loudspeaker and a small-sized display as the output devices.

The apparatus #4 is an acoustic service device left in a room #2 and capable of recognizing a voice, and is called 'Hive' as a wake-up word. The apparatus #3 may have service domains such as music play based on a music service, audio book reading, knowledge search, etc. The apparatus #4 may include a loudspeaker as an output device.

Figure 9:
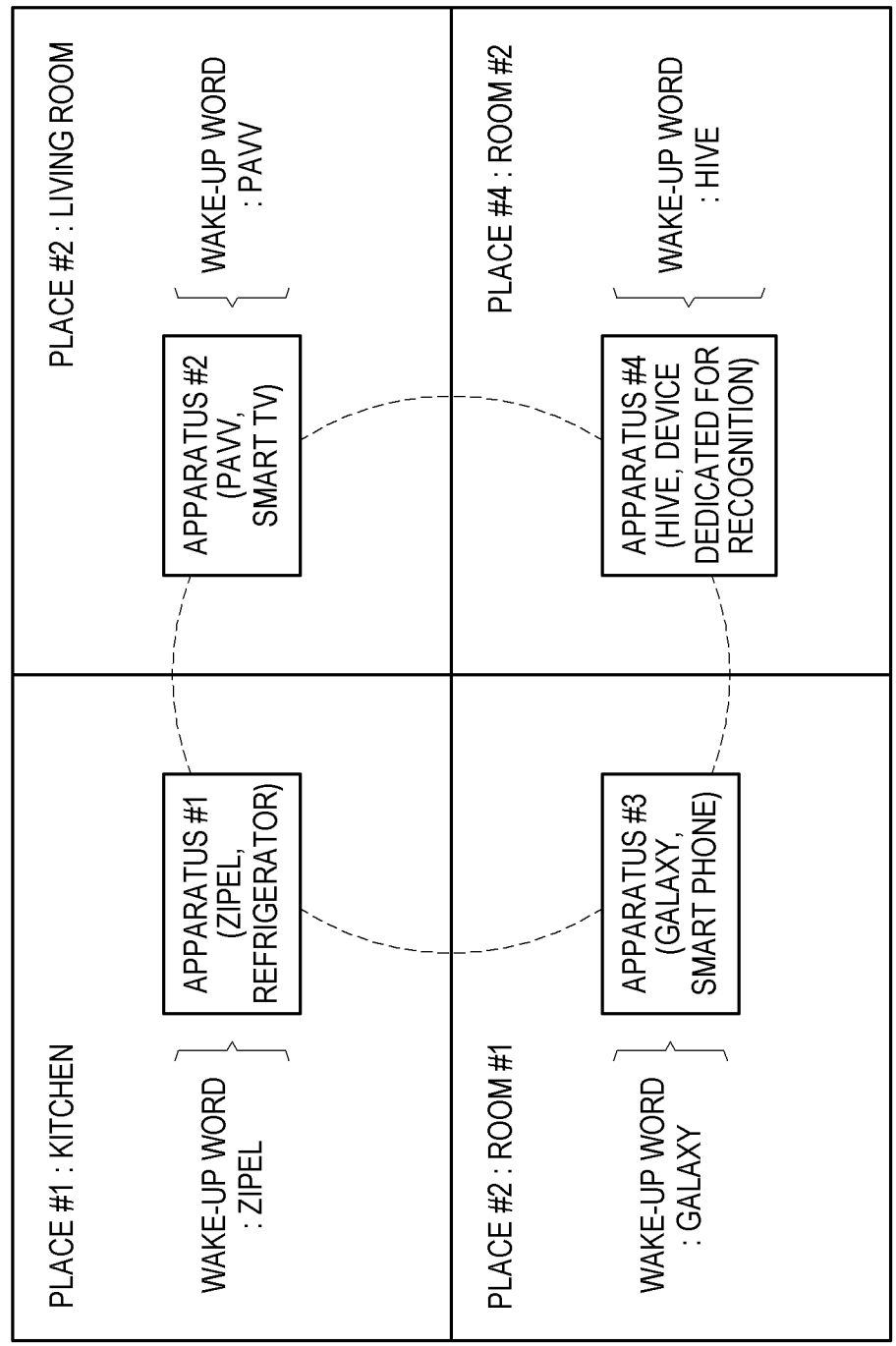

FIG. 9 is a schematic view of identifying a voice recognition apparatus based on a wake-up word among clusters when a network is established among a plurality of voice recognition apparatuses. A user's speech may be transmitted to all the apparatuses, and a request for a user speech service may be made to an apparatus capable of making a proper response through reception or analysis. However, by designating a corresponding voice recognition apparatus with the wake-up word, it is possible to quickly process a user service through less traffic.

Figure 10:
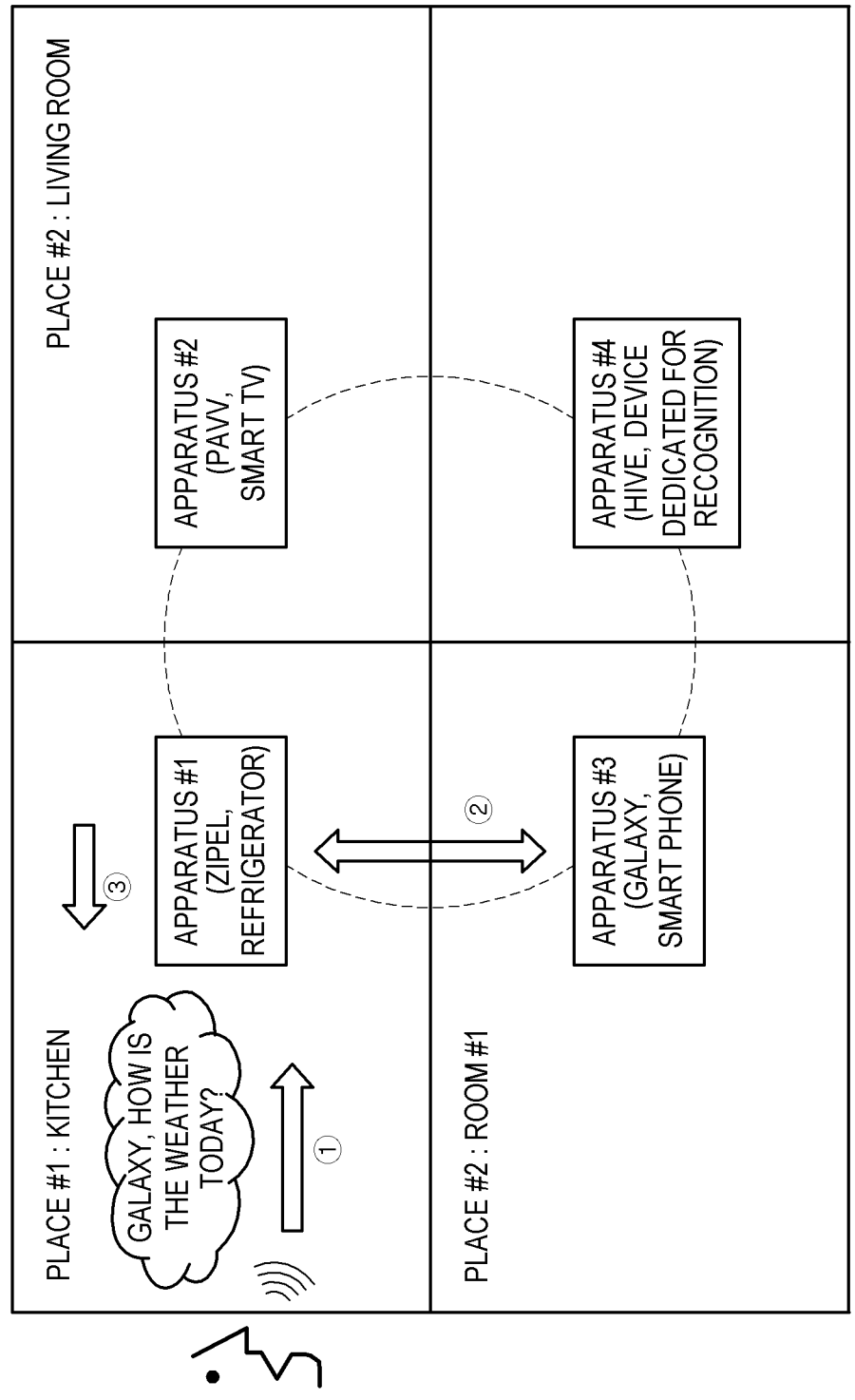

FIG. 10 is a schematic view of showing an example of a scenario that a range of recognizing a user speech is expanded through the clusters of the voice recognition apparatuses. Although there is a limit to a recognition range of the microphone, the voice recognition apparatus cluster is used so that the voice recognition apparatus in the proximity of a user can deliver the user's speech information. On the other hand, according to a conventional scenario, a user has to go to the room #1 and directly make a speech to the smart phone. As shown in FIG. 10, ① when a user makes a speech of 'Galaxy, how is the weather today?' to the apparatus #1 (i.e. the refrigerator), the apparatus #1 (i.e. the refrigerator) recognizes the wake-up word of 'Galaxy' and delivers the speech to the apparatus #3 (i.e. Galaxy). ② The apparatus #3 (i.e. Galaxy) transmits a request service, i.e. weather information to the apparatus #1 (i.e. the refrigerator), and ③ the apparatus #1 (i.e. the refrigerator) informs a user of the received weather information through the display or the loudspeaker.

Figure 11:
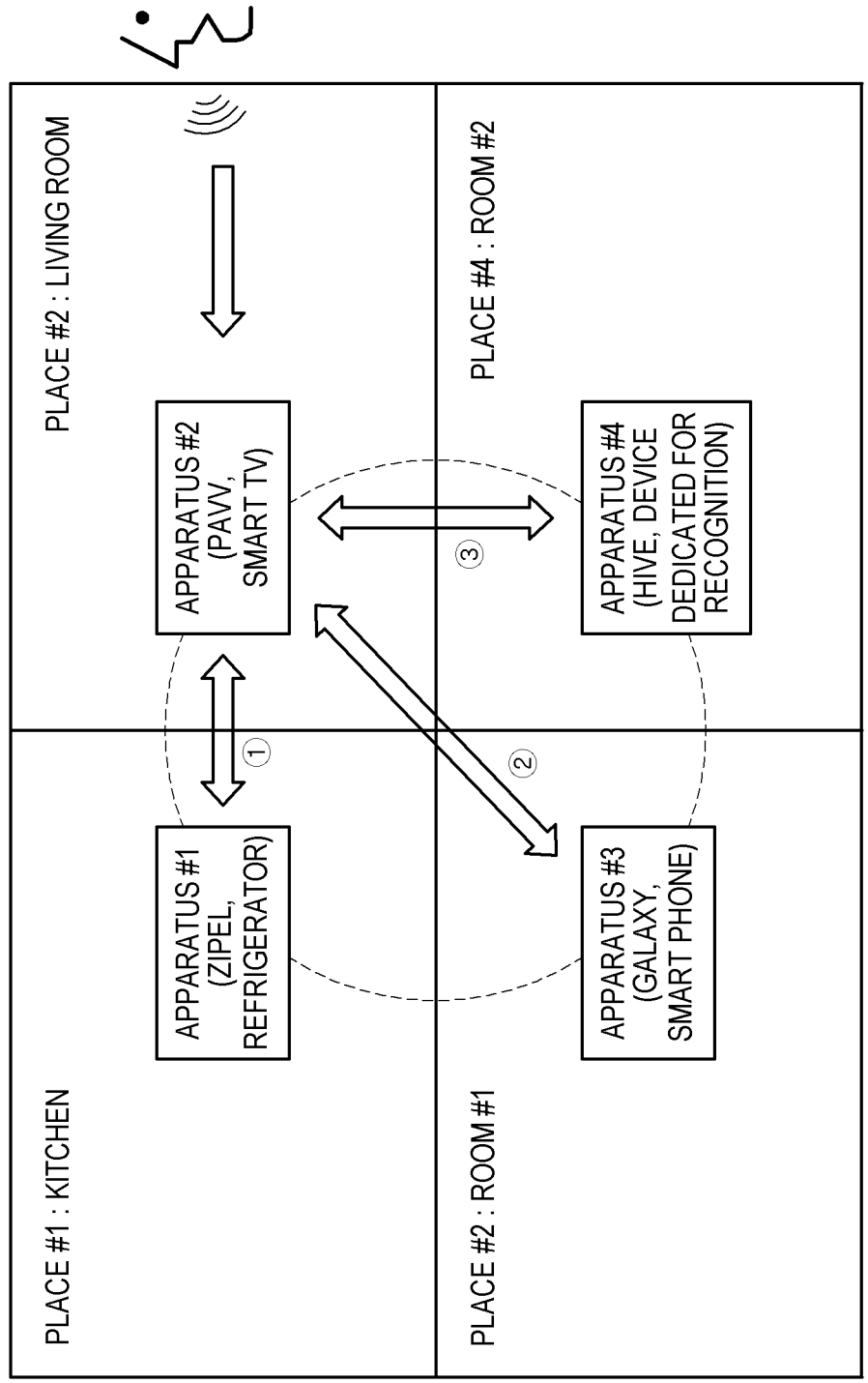

FIG. 11 is a schematic view of illustrating a scenario in which a user receives plentiful services from individual voice recognition apparatuses through the voice recognition apparatus cluster. Most of voice recognition apparatuses are capable of providing services of limited domains because of voice recognition performance, the purposes of the apparatuses, etc. On the other hand, according to one embodiment of the present invention, it is possible to provide various services through the voice recognition apparatus cluster. Although the smart TV itself is capable of just providing a control function and providing simple-content search information, the present invention makes the smart TV provide services in various scenarios as follows. When a voice input of 'Zipel, recommend me a low calorie food?' is made to the smart TV, ① a request service is receivable through the apparatus #1 (i.e. the refrigerator). Further, when a voice input of 'Galaxy, what is my schedule this afternoon?' is made to the apparatus #2 (i.e. the smart TV), ② a request service is receivable through the apparatus #3 (i.e. the smart phone). Further, when a voice input of 'Hive, read an audio book of the little prince' is made to the apparatus #2 (i.e. the smart TV), ③ a request service is receivable through the apparatus #4 (i.e. the acoustic service device).

Figure 12:
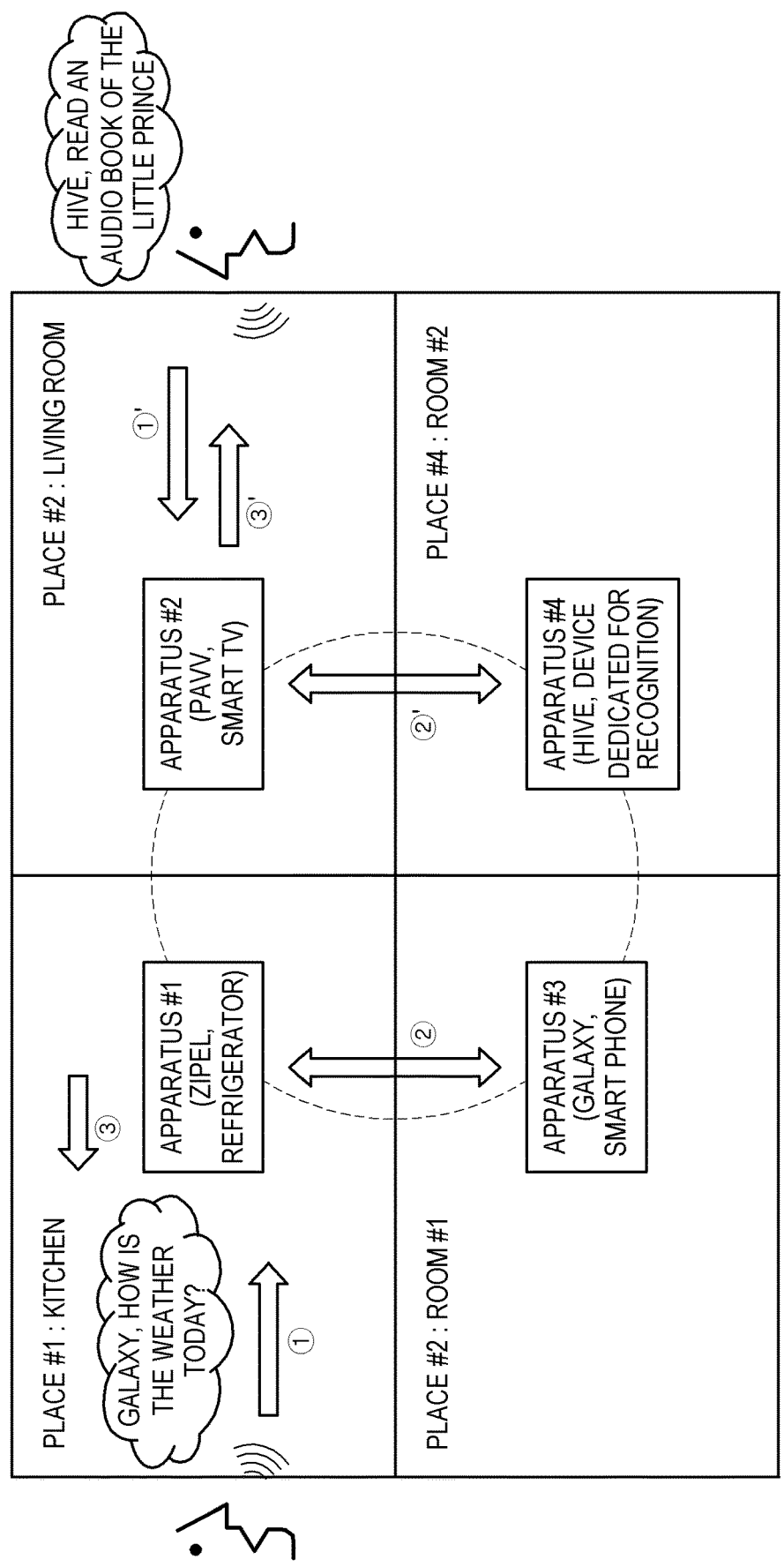

FIG. 12 is a schematic view of illustrating a scenario of receiving updated information through the output device of the voice recognition apparatus. When an voice recognition apparatus includes only either of a loudspeaker (TTS) or a display as the output device, an voice recognition apparatus having a display (or a large-sized display) may be used to provide more plentiful services.

① When a user makes a voice input of 'Galaxy, reproduce the soap opera A' to the apparatus #1 (i.e. the refrigerator), ② image reproduction information is received by transmitting a voice signal to the apparatus #3 (i.e. the smart phone), and then ③ displayed on the display of the apparatus #1 (i.e. the refrigerator). That is, a user can watch the image information of the apparatus #3 (the smart phone) through the middle-sized display provided in the apparatus #1 (i.e. the refrigerator).

①' When a user makes a voice input of 'Hive, read an audio book of the little prince' to the apparatus #2 (i.e. the smart TV), ②' audio information and video information are received by transmitting a voice signal to the apparatus #4 (i.e. the acoustic service device), and then ③' output or displayed through the large-sized display and loudspeaker of the apparatus #2 (i.e. the smart TV). That is, a service provided through only the loudspeaker of the apparatus #4 (i.e. the acoustic service device) is provided to a user through the large-sized display and loudspeaker of the apparatus #2 (i.e. the smart TV).

Although a few exemplary embodiments and drawings have been shown and described, it will be appreciated by those skilled in the art that various modifications and changes may be made in these exemplary embodiments without departing from the principles and spirit of the invention.

The operations according to the foregoing exemplary embodiments may be performed by a single controller or plural controllers. In this case, a program command for performing the operations to be implemented by various computers may be recorded in a computer readable medium. The computer readable medium may contain a program command, a data file, a data structure, etc. or combination thereof. The program command may be specially designed and made for the foregoing embodiments, or publicly known and available to those skilled in the art. As an example of the computer readable medium, there are a magnetic medium such as a hard disk drive, a floppy disk, a magnetic tape, etc. an optical medium such as a compact disc read only memory (CD-ROM), a digital versatile disc (DVD), a magnetic-optical medium such as a floptical disk, and a hardware device such as a read only memory (ROM), a random access memory (RAM), a flash memory, etc. specially configured to store and execute a program command. As an example of the program command, there is not only a machine code made by a compiler but also a high-level language code to be executable by a computer through an interpreter or the like. If a base station or relay described in the present invention is fully or partially achieved by a computer program, the computer readable medium storing the computer program also belong to the present invention.

Therefore, the foregoing has to be considered as illustrative only. The scope of the invention is defined in the appended claims and their equivalents. Accordingly, all suitable modification and equivalents may fall within the scope of the invention.

INDUSTRIAL APPLICABILITY

The present invention is applicable to various electronic apparatuses connected via the IoT at home or office.

What is claimed is:

1. A voice recognition apparatus comprising:
a microphone;
a communicator configured to communicate with a plurality of external voice recognition apparatuses;
a display;
a storage; and
a processor configured to:
control the communicator to transmit information on a display capability of the voice recognition apparatus and receive information on a display capability of the plurality of external voice recognition apparatuses, and store the received information in the storage;
receive, through the microphone, a voice signal from a user;
obtain a wake-up word from the voice signal;
identify, from among the plurality of external voice recognition apparatuses, an external voice recognition apparatus corresponding to the wake-up word obtained from the voice signal;
control the communicator to transmit the voice signal to the identified external voice recognition apparatus;
receive, through the communicator from the identified external voice recognition apparatus, an external recognition result which corresponds to the voice signal recognized by the identified external voice recognition apparatus, the external recognition result regarding content which is identified to correspond to a quality of the image of the content to be displayed on the display based on the transmitted information on the display capability of the voice recognition apparatus; and
control the display to display the image having the quality based on the received external recognition result,
wherein the processor is further configured to:
based on the obtained wake-up word corresponding to the voice recognition apparatus, recognize the voice signal, identify a recognition result based on the recognized voice signal and perform a function corresponding to the identified recognition result among a plurality of functions providable by the voice recognition apparatus,
based on the identified external voice recognition apparatus being a refrigerator, control the communicator to transmit the voice signal to the refrigerator so that the refrigerator:
identifies the external recognition result based on the voice signal transmitted from the voice recognition apparatus, the external recognition result comprising a refrigerator command for at least one of adjusting a temperature of a refrigerator compartment, turning on/off the refrigerator compartment or providing information on a recipe and food to buy, performs a function corresponding to the refrigerator command based on the external recognition result identified by the refrigerator, and transmits information on the function performed by the refrigerator to the voice recognition apparatus so that the voice recognition apparatus displays the information on the function performed by the refrigerator, based on the identified external voice recognition apparatus being a television, control the communicator to transmit the voice signal to the television so that the television:

identifies the external recognition result based on the voice signal transmitted from the voice recognition apparatus, the external recognition result comprising a television command for at least one of displaying a broadcast channel, search content, controlling a function of the television or scheduling a broadcasting program, performs a function corresponding to the television command based on the external recognition result identified by the television, and transmits information on the function performed by the television to the voice recognition apparatus so that the voice recognition apparatus displays the information on the function performed by the television, based on the identified external voice recognition apparatus being a smart phone, control the communicator to transmit the voice signal to the smart phone so that the smart phone:

identifies the external recognition result based on the voice signal transmitted from the voice recognition apparatus, the external recognition result comprising a smart phone command for at least one of making a phone call, providing weather information, searching a news article, setting an alarm or playing music, performs a function corresponding to the smart phone command based on the external recognition result identified by the smart phone, and transmits information on the function performed by smart phone to the voice recognition apparatus so that the voice recognition apparatus displays the information on the function performed by the smart phone, and based on the identified external voice recognition apparatus being an acoustic service device, control the communicator to transmit the voice signal to the acoustic service device so that the acoustic service device:

identifies the external recognition result based on the voice signal transmitted from the voice recognition apparatus, the external recognition result comprising an acoustic service command for at least one of playing music, reading an audio book or knowledge search, performs a function corresponding to the acoustic service command based on the external recognition result identified by the acoustic service device, and transmits information on the function performed by acoustic service device to the voice recognition apparatus so that the voice recognition apparatus displays the information on the function performed by the acoustic service device.

2. The voice recognition apparatus according to claim 1, wherein the processor is configured to receive, through the communicator, a voice signal for requesting a service from at least one external voice recognition apparatus.

3. The voice recognition apparatus according to claim 2, wherein the processor is configured to process the requested service based on the voice signal received from the at least one external voice recognition apparatus.

4. The voice recognition apparatus according to claim 3, wherein the processor is configured to control the communicator to transmit a result of processing the requested service to the at least one external voice recognition apparatus that transmitted the voice signal.

5. The voice recognition apparatus according to claim 4, wherein the processor is configured to control the communicator to transmit the result of processing the requested service suitable for a display capability of the at least one external voice recognition apparatus.

6. The voice recognition apparatus according to claim 2, wherein the processor is configured to control the communicator to transmit the voice signal to a server and receive, through the communicator, information about the requested service based on the voice signal or a result of processing the requested service from the server when the voice recognizer cannot determine information about the requested service based on the voice signal.

7. The voice recognition apparatus according to claim 1, wherein the plurality of external voice recognition apparatuses are connected via Internet of things (IoT).

8. The voice recognition apparatus according to claim 1, wherein the storage is configured to store service domain information of the plurality of external voice recognition apparatuses, and wherein the processor is configured to:
identify the external voice recognition apparatus capable of processing a service requested by the voice signal based on the service domain information, and
control the communicator to transmit the voice signal to the identified external voice recognition apparatus.

9. The voice recognition apparatus according to claim 1, wherein:
the processor is configured to:
control the communicator to transmit the voice signal to the identified external voice recognition apparatus when a service is not determinable from the voice signal.

10. A voice recognition system comprising:
a plurality of voice recognition apparatuses formed as a network cluster for sharing information on a display capability of the plurality of external voice recognition apparatuses, wherein
a first voice recognition apparatus among the plurality of voice recognition apparatuses:
receives a voice signal from a user,
obtains a wake-up word from the voice signal,
identifies, from the plurality of external voice recognition apparatuses, a second external voice recognition apparatus corresponding to the wake-up word obtained from the voice signal, and
transmits the voice signal to the second voice recognition apparatus, and
the second voice recognition apparatus among the plurality of voice recognition apparatuses:
recognizes the voice signal transmitted from the first voice recognition apparatus so that an external recognition result of the voice signal regards a content which is identified to correspond to a quality of an image of the content to be displayed on a display of the first voice recognition apparatus based on the information on the display capability of the first voice recognition apparatus, and transmits the external recognition result to the first voice recognition apparatus which receives the external recognition result and controls the display to display the image having the quality based on the received external recognition result, wherein the first voice recognition apparatus:

based on the obtained wake-up word corresponding to the first voice recognition apparatus, recognizes the voice signal, identifies a recognition result based on the recognized voice signal, and performs a function corresponding to the identified recognition result among a plurality of functions providable by the first voice recognition apparatus, based on the second external voice recognition apparatus being a refrigerator, transmits the voice signal to the refrigerator so that the refrigerator:

identifies the external recognition result based on the voice signal transmitted from the first voice recognition apparatus, the external recognition result comprising a refrigerator command for at least one of adjusting a temperature of a refrigerator compartment, turning on/off the refrigerator compartment or providing information on a recipe and food to buy, performs a function corresponding to the refrigerator command based on the external recognition result identified by the refrigerator, and transmits information on the function performed by the refrigerator to the first voice recognition apparatus so that the first voice recognition apparatus displays the information on the function performed by the refrigerator, based on the second external voice recognition apparatus being a television, transmits the voice signal to the television so that the television:

identifies the external recognition result based on the voice signal transmitted from the first voice recognition apparatus, the external recognition result comprising a television command for at least one of displaying a broadcast channel, search content, controlling a function of the television or scheduling a broadcasting program, performs a function corresponding to the television command based on the external recognition result identified by the television, and transmits information on the function performed by the television to the first voice recognition apparatus so that the first voice recognition apparatus displays the information on the function performed by the television, based on the second external voice recognition apparatus being a smart phone, transmits the voice signal to the smart phone so that the smart phone:

identifies the external recognition result based on the voice signal transmitted from the first voice recognition apparatus, the external recognition result comprising a smart phone command for at least one of making a phone call, providing weather information, searching a news article, setting an alarm or playing music, performs a function corresponding to the smart phone command based on the external recognition result identified by the smart phone, and transmits information on the function performed by smart phone to the first voice recognition apparatus so that the first voice recognition apparatus displays the information on the function performed by the smart phone, and based on the second external voice recognition apparatus being an acoustic service device, transmits the voice signal to the acoustic service device so that the acoustic service device:

identifies the external recognition result based on the voice signal transmitted from the first voice recognition apparatus, the external recognition result comprising an acoustic service command for at least one of playing music, reading an audio book or knowledge search, performs a function corresponding to the acoustic service command based on the external recognition result identified by the acoustic service device, and transmits information on the function performed by acoustic service device to the first voice recognition apparatus so that the first voice recognition apparatus displays the information on the function performed by the acoustic service device.

11. A control method of a voice recognition apparatus, the control method comprising:

transmitting information on a display capability of the voice recognition apparatus and receiving information on a display capability of a plurality of external voice recognition apparatuses, and storing the received information;

receiving a voice signal from a user;

obtaining a wake-up word from the voice signal;

identifying, from among the plurality of external voice recognition apparatuses, an external voice recognition apparatus corresponding to the wake-up word obtained from the voice signal;

transmitting the voice signal to the identified of external voice recognition apparatus;

receiving from the identified external voice recognition apparatus, an external-a recognition result which corresponds to the voice signal recognized by the identified external voice recognition apparatus, the external recognition result regarding content which is identified to correspond to a quality of an image of the content to be displayed on a display based on the transmitted information on the display capability of the voice recognition apparatus; and displaying the image having the quality based on the received external recognition result, the control method further comprising:

based on the obtained wake-up word corresponding to the voice recognition apparatus, recognizing, by the voice recognition apparatus, the voice signal, identifying a recognition result based on the recognized voice signal and performing a function corresponding to the identified recognition result among a plurality of functions providable by the voice recognition apparatus, and based on the identified external voice recognition apparatus being a refrigerator, transmitting the voice signal to the refrigerator so that the refrigerator:

identifies the external recognition result based on the voice signal transmitted from the voice recognition apparatus, the external recognition result comprising a refrigerator command for at least one of adjusting a temperature of a refrigerator compartment, turning on/off the refrigerator compartment or providing information on a recipe and food to buy, performs a function corresponding to the refrigerator command based on the external recognition result identified by the refrigerator, and transmits information on the function performed by the refrigerator to the voice recognition apparatus so that the voice recognition apparatus displays the information on the function performed by the refrigerator, based on the identified external voice recognition apparatus being a television, transmitting the voice signal to the television so that the television:

identifies the external recognition result based on the voice signal transmitted from the voice recognition apparatus, the external recognition result comprising a television command for at least one of displaying a broadcast channel, search content, controlling a function of the television or scheduling a broadcasting program, performs a function corresponding to the television command based on the external recognition result identified by the television, and transmits information on the function performed by the television to the voice recognition apparatus so that the voice recognition apparatus displays the information on the performed function by the television, based on the identified external voice recognition apparatus being a smart phone, transmitting the voice signal to the smart phone so that the smart phone:

identifies the external recognition result based on the voice signal transmitted from the voice recognition apparatus, the external recognition result comprising a smart phone command for at least one of making a phone call, providing weather information, searching a news article, setting an alarm or playing music, performs a function corresponding to the smart phone command based on the external recognition result identified by the smart phone, and transmits information on the function performed by smart phone to the voice recognition apparatus so that the voice recognition apparatus displays the information on the function performed by the smart phone, and based on the identified external voice recognition apparatus being an acoustic service device, transmitting the voice signal to the acoustic service device so that the acoustic service device:

identifies the external recognition result based on the voice signal transmitted from the voice recognition apparatus, the external recognition result comprising an acoustic service command for at least one of playing music, reading an audio book or knowledge search, performs a function corresponding to the acoustic service command based on the external recognition result identified by the acoustic service device, and transmits information on the function performed by acoustic service device to the voice recognition apparatus so that the voice recognition apparatus displays the information on the function performed by the acoustic service device.

12. A non-transitory computer-readable recording medium storing program code, which when executed by one or more computers of a voice recognition apparatus, cause the computers to execute:

controlling a communicator to transmit information on a display capability of a voice recognition apparatus and receive information on a display capability of a plurality of external voice recognition apparatuses;

storing the received information, receiving a voice signal from a user;

obtaining a wake-up word from the voice signal;

identifying, from among the plurality of external voice recognition apparatuses, an external voice recognition apparatus corresponding to the wake-up word obtained from the voice signal;

controlling the communicator to transmit the voice signal to the identified external voice recognition apparatus;

controlling the communicator to receive, from the identified external voice recognition apparatus, an external recognition result which corresponds to the voice signal recognized by the identified external voice recognition apparatus, the external recognition result regarding content which is identified to correspond to a quality of an image of the content to be displayed on a display of the voice recognition apparatus based on the transmitted information on the display capability of the voice recognition apparatus; and control the display to display the image having the quality based on the received external recognition result, the program code causing the computers to further execute:

based on the obtained wake-up word corresponding to the voice recognition apparatus, recognizing, the voice signal, identifying a recognition result based on the recognized voice signal and performing a function corresponding to the identified recognition result among a plurality of functions providable by the voice recognition apparatus, and based on the identified external voice recognition apparatus being a refrigerator, controlling the communicator to transmit the voice signal to the refrigerator so that the refrigerator:

identifies the external recognition result based on the voice signal transmitted from the voice recognition apparatus, the external recognition result comprising a refrigerator command for at least one of adjusting a temperature of a refrigerator compartment, turning on/off the refrigerator compartment or providing information on a recipe and food to buy, performs a function corresponding to the refrigerator command based on the external recognition result identified by the refrigerator, and transmits information on the function performed by the refrigerator to the voice recognition apparatus so that the voice recognition apparatus displays the information on the function performed by the refrigerator, based on the identified external voice recognition apparatus being a television, controlling the communicator to transmit the voice signal to the television so that the television:

identifies the external recognition result based on the voice signal transmitted from the voice recognition apparatus, the external recognition result comprising a television command for at least one of displaying a broadcast channel, search content, controlling a function of the television or scheduling a broadcasting program, performs a function corresponding to the television command based on the external recognition result identified by the television, and transmits information on the function performed by the television to the voice recognition apparatus so that the voice recognition apparatus displays the information on the function performed by the television, based on the identified external voice recognition apparatus being a smart phone, controlling the communicator to transmit the voice signal to the smart phone so that the smart phone:

identifies the external recognition result based on the voice signal transmitted from the voice recognition apparatus, the external recognition result comprising a smart phone command for at least one of making a phone call, providing weather information, searching a news article, setting an alarm or playing music, performs a function corresponding to the smart phone command based on the external recognition result identified by the smart phone, and transmits information on the function performed by smart phone to the voice recognition apparatus so that the voice recognition apparatus displays the information on the function performed by the smart phone, and based on the identified external voice recognition apparatus being an acoustic service device, transmitting the voice signal to the acoustic service device so that the acoustic service device:

identifies the external recognition result based on the voice signal transmitted from the voice recognition apparatus, the external recognition result comprising an acoustic service command for at least one of playing music, reading an audio book or knowledge search, performs a function corresponding to the acoustic service command based on the external recognition result identified by the acoustic service device, and transmits information on the function performed by acoustic service device to the voice recognition apparatus so that the voice recognition apparatus displays the information on the function performed by the acoustic service device.

* * * * *